United States Patent
Nguyen et al.

(10) Patent No.: US 11,168,158 B2
(45) Date of Patent: Nov. 9, 2021

(54) ELECTRON DONORS FOR ZIEGLER-NATTA PRECATALYST PREPARATION AND CATALYST SYSTEM FOR OLEFIN POLYMERIZATION

(71) Applicants: W.R. GRACE & CO.-CONN., Columbia, MD (US); BRASKEM AMERICA, INC., Philadelphia, PA (US)

(72) Inventors: Binh Thanh Nguyen, League City, TX (US); Jonas Alves Fernandes, Pittsburgh, PA (US); Zhenxing Xi, Sugar Land, TX (US)

(73) Assignees: BRASKEM AMERICA, INC., Philadelphia, PA (US); W.R. GRACE & CO.-CONN., Columbia, MD (US)

( * ) Notice: Subject to any disclaimer, the term of this patent is extended or adjusted under 35 U.S.C. 154(b) by 0 days.

(21) Appl. No.: 16/491,098

(22) PCT Filed: Mar. 6, 2017

(86) PCT No.: PCT/US2017/020880
§ 371 (c)(1),
(2) Date: Sep. 4, 2019

(87) PCT Pub. No.: WO2018/164658
PCT Pub. Date: Sep. 13, 2018

(65) Prior Publication Data
US 2020/0010586 A1   Jan. 9, 2020

(51) Int. Cl.
*C08F 10/06*   (2006.01)
*C07F 7/08*   (2006.01)
*C07F 7/30*   (2006.01)

(52) U.S. Cl.
CPC ............ *C08F 10/06* (2013.01); *C07F 7/0816* (2013.01); *C07F 7/30* (2013.01)

(58) Field of Classification Search
CPC .......... C08F 10/06; C07F 7/0816; C07F 7/30
See application file for complete search history.

(56) References Cited

U.S. PATENT DOCUMENTS

| | | |
|---|---|---|
| 2,925,409 A | 2/1960 | Shearer, Jr et al. |
| 5,166,340 A | 11/1992 | Stewart |
| (Continued) | | |

FOREIGN PATENT DOCUMENTS

| | | |
|---|---|---|
| EP | 0 676 07 | 1/1987 |
| EP | 0 129 388 A1 | 7/1989 |
| (Continued) | | |

OTHER PUBLICATIONS

Evangelisti, C. et al., "Sila-substitution of alkyl nitrates: synthesis, structural characterization, and sensitivity studies of highly explosive (nitratomethyl)-, bis (nitratomethyl)-, and tris (nitratomethyl) silanes and their corresponding carbon analogues," Inorganic chemistry, 2010 [Epub.: Apr. 30, 2010], vol. 49, No. 11, pp. 4865-4880.

(Continued)

*Primary Examiner* — Catherine S Branch
(74) *Attorney, Agent, or Firm* — Foley & Lardner LLP

(57) ABSTRACT

A solid precatalyst component for use in olefinic polymerization, includes titanium, magnesium, and an electron donor compound; wherein: the electron donor compound is at least one compound represented by Formula (I).

12 Claims, 2 Drawing Sheets

(56) References Cited

U.S. PATENT DOCUMENTS

| | | | |
|---|---|---|---|
| 5,821,189 A | 10/1998 | Calderazzo et al. | |
| 6,124,380 A | 9/2000 | Bossert et al. | |
| 6,184,319 B1 | 2/2001 | Sato et al. | |
| 6,218,487 B1 | 4/2001 | Van Tol | |
| 6,399,532 B1 | 6/2002 | Dorer et al. | |
| 6,727,385 B1 | 4/2004 | Gotz et al. | |
| 7,410,927 B2 | 8/2008 | Masino | |
| 7,579,428 B2 | 8/2009 | Jernigan | |
| 8,088,872 B2 | 1/2012 | Chen et al. | |
| 8,247,341 B2 | 8/2012 | Gonzalez et al. | |
| 2010/0130710 A1* | 5/2010 | Chen | C08F 10/06 526/194 |
| 2013/0072647 A1* | 3/2013 | Yi | C08F 10/06 526/123.1 |

FOREIGN PATENT DOCUMENTS

| | | |
|---|---|---|
| EP | 0 570 982 | 1/1997 |
| EP | 0 792 901 | 1/2004 |
| EP | 2 242 775 A1 | 10/2011 |
| EP | 2 712 875 A1 | 4/2014 |
| WO | WO-00/26259 A1 | 5/2000 |
| WO | WO-2010/065361 A1 | 6/2010 |
| WO | WO-2010/120973 A1 | 10/2010 |
| WO | WO-2016/038570 A2 | 3/2016 |
| WO | WO-2016/051315 A1 | 4/2016 |
| WO | WO-2016/066956 A1 | 5/2016 |

OTHER PUBLICATIONS

Djerourou, A. et al., "Reactivity of dichlorosilanes with lithium ester enolates: synthesis of 3, 3-disubstituted 3-silaglutarates", Journal of organometallic chemistry, 1995, vol. 485, No. 1, pp. 63-68.

International Search Report and Written Opinion in International Application No. PCT/US2017/020880, dated Dec. 27, 2017 (16 pages).

* cited by examiner

ELECTRON DONORS FOR ZIEGLER-NATTA PRECATALYST PREPARATION AND CATALYST SYSTEM FOR OLEFIN POLYMERIZATION

CROSS-REFERENCE TO RELATED APPLICATIONS

This application is a U.S. National Phase Application under 35 U.S.C. § 371 of International Application No. PCT/US2017/020880, filed on Mar. 6, 2017, the contents of which are incorporated herein by reference in their entirety.

FIELD

The present technology is generally related to polyolefin catalyst systems. More specifically, the technology is related to internal or external electron donors.

BACKGROUND

Polyolefins are a class of polymers derived from simple olefins. Known methods of making polyolefins involve the use of Ziegler-Natta polymerization catalysts. These catalysts polymerize vinyl monomers using a transition metal halide to provide a polymer with a highly isotactic stereochemical configuration.

Basically two types of Ziegler-Natta catalyst systems are used in the normal processes for the polymerization or copolymerization of olefins. The first one, in its broadest definition, comprises $TiCl_3$-based catalyst components, obtained by reduction of $TiCl_4$ with aluminum alkyls, used in combination with aluminum compounds such as diethylaluminum chloride (DEAC). Despite the modest properties of the polymers in terms of isotacticity the catalysts are characterized by a very low activity which causes the presence of large amounts of catalytic residues in the polymers.

The second type of catalyst system includes a solid precatalyst component, having a magnesium dihalide on which are supported a titanium compound and an internal electron donor compound. In order to maintain the high selectivity for an isotactic polymer product, a variety of internal electron donor compounds must be added during the precatalyst synthesis. Prior the polymerization reaction, the oxidation state of the titatnium compound is reduced in presence of an aluminium alkyl to form the catalyst. Conventionally, when a higher crystallinity of the polymer is required, an external donor compound may also be added during the polymerization reaction. Both the internal and external electron donor compounds become important compositions of the catalyst system.

SUMMARY

In one aspect, a solid precatalyst component for use in olefinic polymerization is provided, the solid precatalyst component includes titanium, magnesium, and an electron donor compound. The electron donor compound includes at least one compound represented by Formula (I):

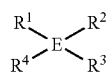

(I)

In Formula (I), E may be a tetravalent metal or metalloid atom; $R^1$, $R^2$, $R^3$, and $R^4$ may be independently a linear, branched, or cyclic $C_1$-$C_{20}$ hydrocarbyl group optionally interrupted or substituted by one or more functional groups selected from the group consisting of heteroaryl, ether, ester, amide, carbonate, halogens, phosphate, sulfate, sulfide, sulfoxide, sulfone, carbamate, and a combination of any two or more thereof; or two or more of $R^1$, $R^2$, $R^3$, and $R^4$ are cyclized to form a hydrocarbyl ring structure optionally interrupted or substituted by one or more functional groups selected from the group consisting of ether, ester, amide, carbonate, halogens, phosphate, sulfate, sulfide, sulfoxide, sulfone, carbamate, and a combination of any two or more thereof; and where: at least one of $R^1$, $R^2$, $R^3$, or $R^4$ is interrupted or substituted by one or more functional groups selected from the group consisting of ether, ester, amide, carbonate, halogens, phosphate, sulfate, sulfide, sulfoxide, sulfone, carbamate, and a combination of any two or more thereof.

In another aspect, a solid precatalyst component for use in olefinic polymerization is provided, the solid precatalyst component including a reaction product of a titanium compound, a magnesium compound, and an electron donor compound, wherein the electron donor compound is at least one compound represented by Formula (I):

(I)

In Formula (I), E may be a tetravalent metal or metalloid atom; $R^1$, $R^2$, $R^3$, and $R^4$ may be independently a linear, branched, or cyclic $C_1$-$C_{20}$ hydrocarbyl group optionally interrupted or substituted by one or more functional groups selected from the group consisting of heteroaryl, ether, ester, amide, carbonate, halogens, phosphate, sulfate, sulfide, sulfoxide, sulfone, carbamate, and a combination of any two or more thereof; or two or more of $R^1$, $R^2$, $R^3$, and $R^4$ are cyclized to form a hydrocarbyl ring structure optionally interrupted or substituted by one or more functional groups selected from the group consisting of ether, ester, amide, carbonate, halogens, phosphate, sulfate, sulfide, sulfoxide, sulfone, carbamate, and a combination of any two or more thereof; and where: at least one of $R^1$, $R^2$, $R^3$, or $R^4$ is interrupted or substituted by one or more functional groups selected from the group consisting of ether, ester, amide, carbonate, halogens, phosphate, sulfate, sulfide, sulfoxide, sulfone, carbamate, and a combination of any two or more thereof.

In another aspect, a catalyst system for use in olefinic polymerization is provided, the catalyst system including any of the olefin polymerization catalysts described herein with an organoaluminum compound. In some embodiments, the solid precatalyst system described herein may further include at least one secondary electron donor as described herein. In some embodiments, the catalyst system may further include an organosilicon compound.

In another aspect, a process is provided for polymerizing or copolymerizing an olefin monomer, the process including providing any of the catalyst systems described herein, polymerizing or copolymerizing the olefin monomer in the presence of the catalyst system to form a polymer or a copolymer; and recovering the polymer or the copolymer.

DETAILED DESCRIPTION

Figure 1:
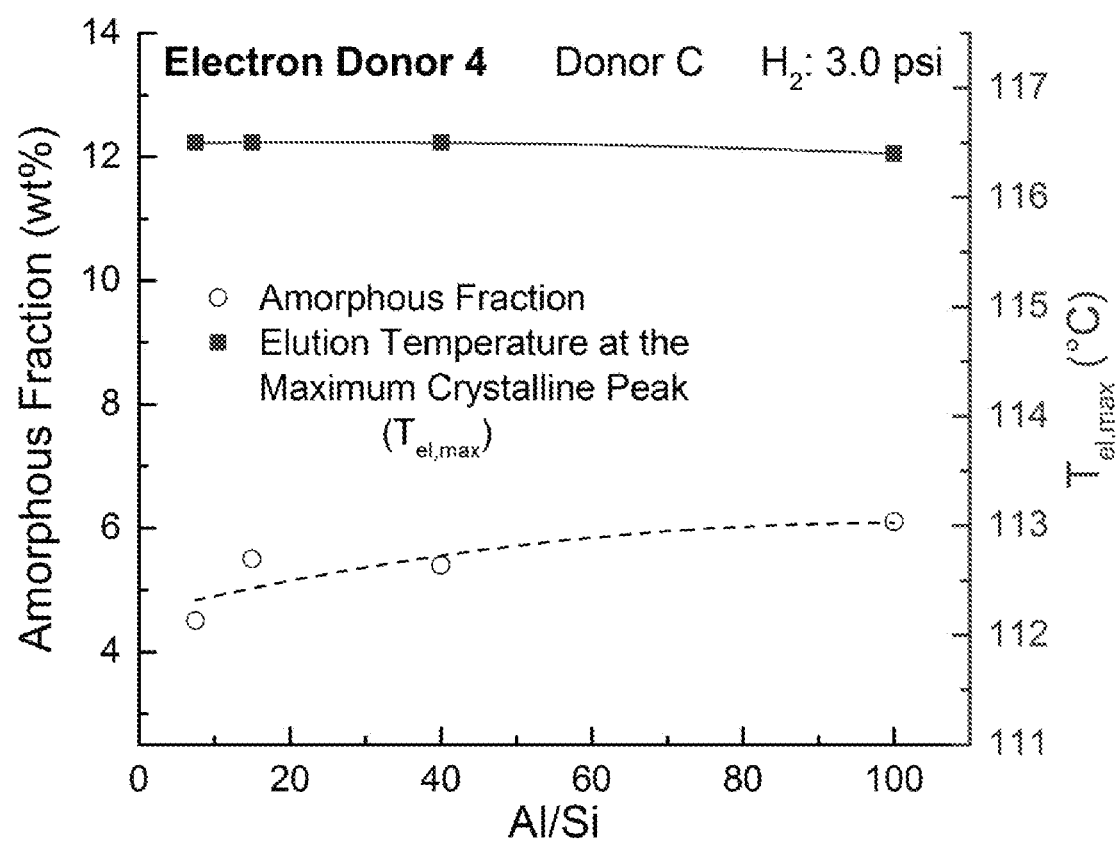
FIG. 1 is a crystallization elution fraction (CEF) diagram of Al/Si versus the amorphous fraction and a CEF diagram of Al/Si versus elution temperature at the maximum crystalline peak, according to the examples.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and may be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, hydrocarbyl refers to groups containing only hydrogen and carbon atoms. Such groups may be saturated or unsaturated, branched or unbranched and may contain aromatic and/or aliphatic moieties.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. An alkyl group may be substituted one or more times. An alkyl group may be substituted two or more times. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, isopentyl groups, and 1-cyclopentyl-4-methylpentyl. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=CH$_2$, C=CH$_2$, or C=CHCH$_3$.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. An aryl group with one or more alkyl groups may also be referred to as alkaryl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

Heterocyclyl or heterocycle refers to both aromatic and nonaromatic ring compounds including monocyclic, bicyclic, and polycyclic ring compounds containing 3 or more ring members of which one or more is a heteroatom such as, but not limited to, N, O, and S. Examples of heterocyclyl groups include, but are not limited to: unsaturated 3 to 8 membered rings containing 1 to 4 nitrogen atoms such as, but not limited to pyrrolyl, pyrrolinyl, imidazolyl, pyrazolyl, pyridinyl, dihydropyridinyl, pyrimidinyl, pyrazinyl, pyridazinyl, triazolyl (e.g. 4H-1,2,4-triazolyl, 1H-1,2,3-triazolyl, 2H-1,2,3-triazolyl etc.), tetrazolyl, (e.g. 1H-tetrazolyl, 2H tetrazolyl, etc.); saturated 3 to 8 membered rings containing 1 to 4 nitrogen atoms such as, but not limited to, pyrrolidinyl, imidazolidinyl, piperidinyl, piperazinyl; condensed unsaturated heterocyclic groups containing 1 to 4 nitrogen atoms such as, but not limited to, indolyl, isoindolyl, indolinyl, indolizinyl, benzimidazolyl, quinolyl, isoquinolyl, indazolyl, benzotriazolyl; unsaturated 3 to 8 membered rings containing 1 to 2 oxygen atoms and 1 to 3 nitrogen atoms such as, but not limited to, oxazolyl, isoxazolyl, oxadiazolyl (e.g. 1,2,4-oxadiazolyl, 1,3,4-oxadiazolyl, 1,2,5-oxadiazolyl, etc.); saturated 3 to 8 membered rings containing 1 to 2 oxygen atoms and 1 to 3 nitrogen atoms such as, but not limited to, morpholinyl; unsaturated condensed heterocyclic groups containing 1 to 2 oxygen atoms and 1 to 3 nitrogen atoms, for example, benzoxazolyl, benzoxadiazolyl, benzoxazinyl (e.g. 2H-1,4-benzoxazinyl etc.); unsaturated 3 to 8 membered rings containing 1 to 3 sulfur atoms and 1 to 3 nitrogen atoms such as, but not limited to, thiazolyl, isothiazolyl, thiadiazolyl (e.g. 1,2,3-thiadiazolyl, 1,2,4-thiadiazolyl, 1,3,4-thiadiazolyl, 1,2,5-thiadiazolyl, etc.); saturated 3 to 8 membered rings containing 1 to 2 sulfur atoms and 1 to 3 nitrogen atoms such as, but not limited to, thiazolodinyl; saturated and unsaturated 3 to 8 membered rings containing 1 to 2 sulfur atoms such as, but not limited to, thienyl, dihydrodithiinyl, dihydrodithionyl, tetrahydrothiophene, tetrahydrothiopyran; unsaturated condensed heterocyclic rings containing 1 to 2 sulfur atoms and 1 to 3 nitrogen atoms such as, but not limited to, benzothiazolyl, benzothiadiazolyl, benzothiazinyl (e.g. 2H-1,4-benzothiazinyl, etc.), dihydrobenzothiazinyl (e.g. 2H-3,4-dihydrobenzothiazinyl, etc.), unsaturated 3 to 8 membered rings containing oxygen atoms such as, but not limited to furyl; unsaturated condensed heterocyclic rings containing 1 to 2 oxygen atoms such as benzodioxolyl (e.g., 1,3-benzodioxoyl, etc.); unsaturated 3 to 8 membered rings containing an oxygen atom and 1 to 2 sulfur atoms such as, but not limited to, dihydrooxathiinyl; saturated 3 to 8 membered rings containing 1 to 2 oxygen atoms and 1 to 2 sulfur atoms such as 1,4-oxathiane; unsaturated condensed rings containing 1 to 2 sulfur atoms such as benzothienyl, benzodithiinyl; and unsaturated condensed heterocyclic rings containing an oxygen atom and 1 to 2 oxygen atoms such as benzoxathiinyl. Heterocyclyl group also include those described above in which one or more S atoms in the ring is double-bonded to one or two oxygen atoms (sulfoxides and sulfones). For example, heterocyclyl groups include tetrahydrothiophene oxide and tetrahydrothiophene 1,1-dioxide. Typical heterocyclyl groups contain 5 or 6 ring members. Thus, for example, heterocyclyl groups include morpholinyl, piperazinyl, piperidinyl, pyrrolidinyl, imidazolyl, pyrazolyl, 1,2,3-triazolyl, 1,2,4-triazolyl, tetrazolyl, thiophenyl, thiomorpholinyl, thiomorpholinyl in which the S atom of the thiomorpholinyl is bonded to one or more O atoms, pyrrolyl, pyridinyl homopiperazinyl, oxazolidin-2-onyl, pyrrolidin-2-onyl, oxazolyl, quinuclidinyl, thiazolyl, isoxazolyl, furanyl, dibenzylfuranyl, and tetrahydrofuranyl. Heterocyclyl or heterocycles may be substituted.

Heteroaryl groups are aromatic ring compounds containing 5 or more ring members, of which, one or more is a heteroatom such as, but not limited to, N, O, and S. Heteroaryl groups include, but are not limited to, groups such as pyrrolyl, pyrazolyl, triazolyl, tetrazolyl, oxazolyl, isoxazolyl, thiazolyl, pyridinyl, pyridazinyl, pyrimidinyl, pyrazinyl, thiophenyl, benzothiophenyl, furanyl, benzofuranyl, dibenzofuranyl, indolyl, azaindolyl (pyrrolopyridinyl), indazolyl, benzimidazolyl, imidazopyridinyl (azabenzimidazolyl), pyrazolopyridinyl, triazolopyridinyl, benzotriazolyl, benzoxazolyl, benzothiazolyl, benzothiadiazolyl, imidazopyridinyl, isoxazolopyridinyl, thianaphthyl, purinyl, xanthinyl, adeninyl, guaninyl, quinolinyl, isoquinolinyl, tetrahydroquinolinyl, quinoxalinyl, and quinazolinyl groups. Heteroaryl groups include fused ring compounds in which all rings are aromatic such as indolyl groups and include fused ring compounds in which only one of the rings is aromatic, such as 2,3-dihydro indolyl groups. Although the phrase "heteroaryl groups" includes fused ring compounds, the phrase does not include heteroaryl groups that have other groups bonded to one of the ring members, such as alkyl groups. Rather, heteroaryl groups with such substitution are referred to as "substituted heteroaryl groups." Representative substituted heteroaryl groups may be substituted one or more times with various substituents such as those listed above.

As used herein, the prefix "halo" refers to a halogen (i.e. F, Cl, Br, or I) being attached to the group being modified by the "halo" prefix. For example, haloaryls are halogenated aryl groups.

Groups described herein having two or more points of attachment (i.e., divalent, trivalent, or polyvalent) within the compound of the present technology are designated by use of the suffix, "ene." For example, divalent alkyl groups are alkylene groups, divalent aryl groups are arylene groups, divalent heteroaryl groups are divalent heteroarylene groups, and so forth.

In one aspect, a solid precatalyst component containing titanium, magnesium, halogen and electron donor compounds is provided. In the solid precatalyst component, the electron donor is at least one compound represented by Formula (I), vide infra. Also provided are olefin polymerization catalyst systems containing the solid catalyst components, organoaluminums, and organosilicons. In other aspects, methods of making the solid precatalyst components and the catalyst systems are provided. Additionally, methods of polymerizing and copolymerizing olefins using the catalyst systems are provided.

In one aspect, a solid precatalyst component includes titanium, magnesium, and an electron donor compound. In particular, the solid precatalyst component includes a titanium compound having at least one titanium-halogen bond and the electron donor compound. The titanium compound may be $TiCl_4$. The electron donor may be at least one compound represented by Formula (I):

(I)

In Formula (I), E may a tetravalent metal or metalloid atom; $R^1$, $R^2$, $R^3$, and $R^4$ are independently a linear, branched, or cyclic $C_1$-$C_{20}$ hydrocarbyl group optionally interrupted or substituted by one or more functional groups selected from the group consisting of heteroaryl, ether, ester, amide, carbonate, halogens, phosphate, sulfate, sulfide, sulfoxide, sulfone, carbamate, and a combination of any two or more thereof or two or more of $R^1$, $R^2$, $R^3$, and $R^4$ are cyclized to form a hydrocarbyl ring structure optionally interrupted or substituted by one or more functional groups selected from the group consisting of ether, ester, amide, carbonate, halogens, phosphate, sulfate, sulfide, sulfoxide, sulfone, carbamate, and a combination of any two or more thereof. Further, Formula (I) may be subject to a proviso, including where at least one of $R^1$, $R^2$, $R^3$, or $R^4$ is interrupted or substituted by one or more functional groups selected from the group consisting of ether, ester, amide, carbonate, halogens, phosphate, sulfate, sulfide, sulfoxide, sulfone, carbamate, and a combination of any two or more thereof.

In any of the above solid precatalyst components, E may be silicon (Si) or germanium (Ge). Further, Formula (I) may be subject to a proviso, including that when E is Si, two or more of $R^1$, $R^2$, $R^3$, and $R^4$ are cyclized to form a hydrocarbyl ring structure optionally interrupted or substituted by one or more functional groups selected from the group consisting of ether, ester, amide, carbonate, halogens, phosphate, sulfate, sulfide, sulfoxide, sulfone, carbamate, and a combination of any two or more thereof.

In some of the above embodiments of the compound of Formula (I), $R^1$, $R^2$, $R^3$, and $R^4$ may be independently an alkyl, cycloalkyl, aryl, heteroaryl, or aralkyl group, optionally interrupted or substituted by one or more functional groups selected from the group consisting of ether, ester, amide, carbonate, halogens, phosphate, sulfate, sulfide, sulfoxide, sulfone, carbamate, and a combination of any two or more thereof. Further, Formula (I) may be subject to a proviso, including that at least one of $R^1$, $R^2$, $R^3$, or $R^4$ is interrupted or substituted by one or more functional groups selected from the group consisting of ether, ester, amide, carbonate, halogens, phosphate, sulfate, sulfide, sulfoxide, sulfone, carbamate, and a combination of any two or more thereof.

In some of the above embodiments of the compound of Formula (I), $R^1$ and $R^2$ are each independently a linear, branched, or cyclic $C_1$-$C_{20}$ hydrocarbyl group interrupted by one or more functional groups selected from the group consisting of ester, amide, carbonate, carbamate, and a combination of any two or more thereof.

In additional and alternative embodiments, $R^1$ and $R^2$ may be independently a moiety represented by formulae IIA, IIB, IIC, IID, IIIA, or IIIB:

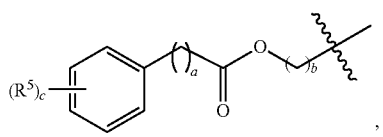
(IIA)

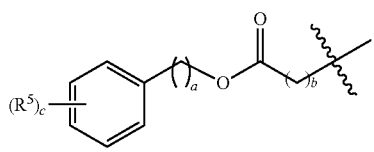
(IIB)

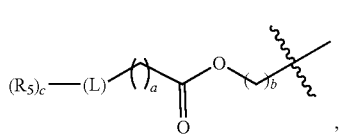
(IIC)

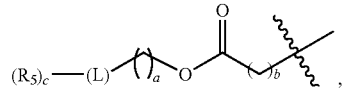
(IID)

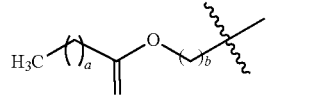
(IIIA)
, or

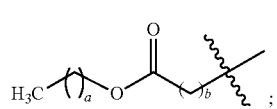
(IIIB)
;

wherein:
L may be a heteroaryl group; $R^5$ may be alkyl, cycloalkyl, aryl, aralkyl or heteroaryl, optionally interrupted or substituted by one or more functional groups selected from the group consisting of ether, ester, amide, carbonate, halogens, phosphate, sulfate, sulfide, sulfoxide, sulfone, carbamate, and a combination of any two or more thereof a and b each may be independently an integer from 0 to 20, and c may be an integer from 0 to 5.

In some embodiments of the compound of Formula (I), $R^3$ and $R^4$ may each be independently an alkyl, cycloalkyl, or aryl group; or $R^3$ and $R^4$ together with E may be cyclized to form a $C_4$-$C_6$ hydrocarbyl ring structure, optionally interrupted by one or more heteroatoms selected from the group consisting of O, S, and N. In alternative embodiments, $R^3$ and $R^4$ together with E may be cyclized to form a heteroaryl group optionally interrupted or substituted by one or more functional groups selected from the group consisting of ether, ester, amide, carbonate, halogens, phosphate, sulfate, sulfide, sulfoxide, sulfone, carbamate, and a combination of any two or more thereof.

In some embodiments of the compound of Formula (I), E may be Si or Ge; $R^1$ and $R^2$ each may independently have formula IIA, IIB, IIC, or IID; a may be 0, b may be 1 or 2; c may be 0, 1 or 2; and each $R^5$ may be independently an alkyl, aryl, or heteroaryl group.

In some embodiments of the compound of Formula (I), E may be Si or Ge; $R^1$ and $R^2$ each may independently have formula IIIA or IIIB; a may be 0, 1, 2, 3, or 4; and b may be 1 or 2.

In some embodiments of the compound of Formula (I), $R^3$ and $R^4$ may be independently alkyl, cycloalkyl, aryl, heteroaryl, or aralkyl group; or $R^3$ and $R^4$ together with E may be cyclized to form a hydrocarbyl ring structure optionally interrupted or substituted by one or more functional groups selected from the group consisting of ether, ester, amide, carbonate, halogens, phosphate, sulfate, sulfide, sulfoxide, sulfone, carbamate, and a combination of any two or more thereof.

In some embodiments of the compound of Formula (I), $R^3$ and $R^4$ may be independently aryl or heteroaryl; or $R^3$ and $R^4$ together with E may be cyclized to form a hydrocarbyl ring structure.

In particular embodiments of the compound of Formula (I), E may be Si; $R^1$ and $R^2$ may be independently a moiety represented by formula IIA, IIB, IIC, or BD; a may be 0, b may be 1 or 2; c may be 1 or 2; $R^5$ may be a $C_1$-$C_6$ alkyl, $C_3$-$C_6$ cycloalkyl, aryl or heteroaryl group, optionally interrupted or substituted by one or more functional groups selected from the group consisting of ether, ester, amide, carbonate, halogens, phosphate, sulfate, sulfide, sulfoxide, sulfone, carbamate, and a combination of any two or more thereof; and $R^3$ and $R^4$ together with E may be cyclized to form a hydrocarbyl ring structure.

In particular embodiments of the compound of Formula (I), E may be Ge; $R^1$ and $R^2$ are independently a moiety represented by formula IIIA or IIIB; a may be 0, 1, 2, 3, or 4; b may be 1 or 2; and $R^3$ and $R^4$ may be independently alkyl, aryl, or heteroaryl.

In certain particular embodiments of the compound of Formula (I), E may be Si; $R^1$ and $R^2$ are independently a moiety represented by formula IIA, IIB, IIC, or BD; a may be 0, 1, 2, 3, or 4; b may be 1 or 2; and $R^3$ and $R^4$ may be independently alkyl, aryl, or heteroaryl.

In particular embodiments of the compound of Formula (I), $R^1$ and $R^2$ are the same. In additional or alternative embodiments of the compound of Formula (I), $R^3$ and $R^4$ are the same.

Illustrative compounds of Formula I include, but are not limited to, silolane-1,1-diylbis(methylene) dibenzoate; silinane-1,1-diylbis(methylene) bis(4-methylbenzoate); silinane-1,1-diylbis(methylene) dibenzoate; (diphenylgermanediyl)bis(methylene) dibenzoate; (diphenylgermanediyl)bis(methylene) bis(4-methylbenzoate); dibutyl 2,2'-(diphenylgermanediyl)diacetate; (dibutylgermanediyl)bis(methylene) dibenzoate; siletane-1,1-diylbis(methylene) dibenzoate; or silinane-1,1-diylbis(methylene) bis(furan-2-carboxylate).

In some embodiments, the solid precatalyst component may further include at least one secondary electron donor compound selected from the group consisting of mono- or poly-carboxylic esters, ethers, ketones, organic compounds containing carboxylic and ether groups, organic compounds containing carboxylic groups and carbonyl groups, and organic compounds containing carboxylic groups, ether groups, and carbonyl groups.

In some embodiments, the secondary electron donor compound may be selected from the group consisting of: a compound represented by general formula (IV):

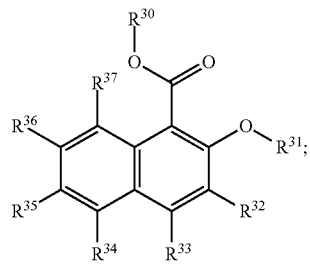

(IV)

a compound represented by general formula (V):

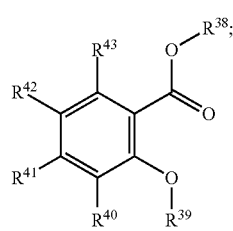

(V)

a compound represented by general formula (VI):

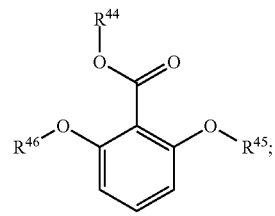

(VI)

a compound represented by general formula (VII):

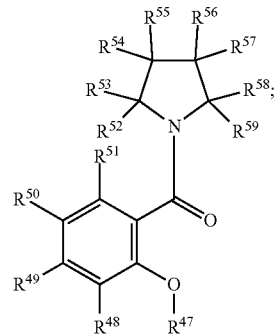

(VII)

a compound represented by general formula (VIII):

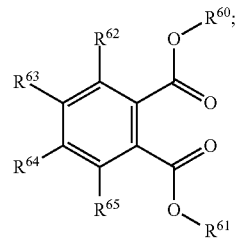

(VIII)

a compound represented by general formula (IX):

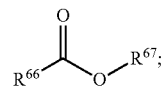

(IX)

a compound represented by general formula (X):

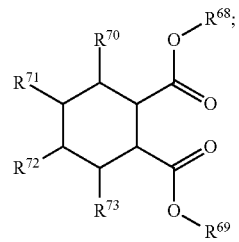

(X)

and combinations thereof, wherein $R^{30}$ is selected from the group consisting of a hydrogen; a halogen; and a linear or branched, cycylic or arcyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;

$R^{31}$ is selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;

$R^{32}$, $R^{33}$, $R^{34}$, $R^{35}$, $R^{36}$, and $R^{37}$ are each independently selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;

$R^{38}$ is selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;

$R^{39}$ is selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;

$R^{40}$, $R^{41}$, $R^{42}$, and $R^{43}$ are each independently selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;

$R^{44}$, $R^{45}$ and $R^{46}$ are each independently selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;

$R^{47}$ is selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;

$R^{48}$, $R^{49}$, $R^{50}$, and $R^{51}$ are each independently selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;

$R^{52}$, $R^{53}$, $R^{54}$, $R^{55}$, $R^{56}$, $R^{57}$, $R^{58}$, and $R^{59}$ are each independently selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;

$R^{60}$ and $R^{61}$ are each independently selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;

$R^{62}$, $R^{63}$, $R^{64}$ and $R^{65}$ are each independently selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;

$R^{66}$ is selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;

$R^{67}$ is selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;

$R^{68}$ and $R^{69}$ are each independently selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens; and $R^{70}$, $R^{71}$, $R^{72}$, and $R^{73}$ are each independently selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens.

Without being bound by theory, it is believed that use of the electron donor compound contributes to improved performance characteristics of resultant catalysts, such as high/improved catalyst activity, high/improved hydrogen response, the ability to produce polyolefins with desired/controllable crystallinity measured by polymer fractionation values and $^{13}C$ NMR analysis and desired/controllable molecular weight measured by melt flow indexes and high temperature size exclusion chromatography (HSEC), and the like.

Further, without being bound by theory, the compound of Formula (I) may be used as an internal or external electron donor in the solid precatalyst component or the solid catalyst system.

The solid precatalyst component generates a highly active catalyst system after reaction with aluminium alkyl, which may include a reaction with titanium compound and electron donor compound supported on a magnesium compound. The titanium compounds used in the preparation of the solid precatalyst component include, for example, a tetravalent titanium compound represented by chemical formula (XI):

$$Ti(OR)_gX_{4-g} \quad (XI),$$

where R represents a $C_1$-$C_{20}$ alkyl; X represents a halogen atom; and g is from 0 to 4, inclusive. Illustrative titanium compounds include, but are not limited to, titanium tetrahalides such as $TiCl_4$, $TiBr_4$, and $TiI_4$; alkoxytitanium trihalides such as $Ti(OCH_3)Cl_3$, $Ti(OC_3H_5)Cl_3$, $Ti(O-n-C_4H_9)Cl_3$, $Ti(OC_2H_5)Br_3$ and $Ti(O-i-C_4H_9)Br_3$; dialkoxytitanium dihalides such as $Ti(OCH_3)_2Cl_2$, $Ti(OC_2H_5)_2Cl_2$, $Ti(O-n-C_4H_9)_2Cl_2$ and $Ti(OC_2H_5)_2Br_2$; trialkoxytitanium monohalides such as $Ti(OCH_3)_3Cl$, $Ti(OC_2H_5)_3Cl$, $Ti(O-n-C_4H_9)_3Cl$ and $Ti(OC_2H_5)_3Br$; and tetraalkoxytitaniums such as $Ti(OCH_3)_4$, $Ti(OC_2H_5)_4$ and $Ti(O-n-C_4H_9)_4$. Among these, the titanium tetrahalides, are employed in some embodiments. The titanium compounds may be used individually or in solutions of hydrocarbon compounds or halogenated hydrocarbons.

The magnesium compounds used in the preparation of the solid precatalyst component include, for example, a magnesium compound having no reducibility. In one embodiment, the magnesium compound having no reducibility is a halogen containing magnesium compound. Specific examples of the magnesium compound having no reducibility include, but are not limited to, magnesium halides such as magnesium chloride, magnesium bromide, magnesium iodide and magnesium fluoride; alkoxy magnesium halides such as methoxy magnesium chloride, ethoxy magnesium chloride, isopropoxy magnesium chloride, butoxy magnesium chloride and octoxy magnesium chloride; aryloxy magnesium halides such as phenoxy magnesium chloride and methylphenoxy magnesium chloride; alkoxy magnesiums such as ethoxy magnesium, isopropoxy magnesium, butoxy magnesium, n-octoxy magnesium and 2-ethylhexoxy magnesium; aryloxy magnesiums such as phenoxy magnesium and dimethylphenoxy magnesium; and carboxylic acid salts of magnesium such as magnesium laurate and magnesium stearate. These magnesium compounds may be in the liquid or solid state.

In one aspect, halogen containing magnesium compounds, such as magnesium chloride, alkoxy magnesium chlorides and aryloxy magnesium chlorides, are employed.

When preparing the solid precatalyst component, an electron donor may be used/added. The solid titanium catalyst component may be made by contacting a magnesium compound and a titanium compound with an electron donor compound. In one embodiment, the titanium catalyst component is contact with a magnesium compound and a titanium compound in the presence of an electron donor compound. In another embodiment, the precatalyst component is made by forming a magnesium-based precatalyst support optionally with the titanium compound and optionally with the electron donor compound, and contacting the magnesium-based precatalyst support with the titanium compound and the electron donor compound.

In one embodiment, the solid precatalyst component includes at least one of the electron donor compounds of Formula (I), but does not include other electron donors. In another embodiment, the solid precatalyst component includes other electron donors in addition to the at least one electron donor of Formula (I). For example, when preparing the solid precatalyst component, other electron donors may be used/added in addition to the at least one electron donors of Formula (I). In some embodiments, the electron donor compound of Formula (I) functions as an internal electron donor in the solid precatalyst component. In other embodiments, the electron donor compound of Formula (I) functions as an external electron donor in the solid catalyst system, when the electron donor compound of formula (I) is added during the polymerization process (i.e., after reduction of Ti(IV) in presence of organoaluminiun compounds).

Examples of other electron donors include oxygen-containing electron donors such as organic acid esters. Specific examples include, but are not limited to, diethyl ethylmalonate, diethyl propylmalonate, diethyl isopropylmalonate, diethyl butylmalonate, diethyl 1,2-cyclohexanedicarboxylate, di-2-ethylhexyl 1,2-cyclohexanedicarboxylate, di-2-isononyl 1,2-cyclohexanedicarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, diisononyl phthalate, di-2-ethylhexyl phthalate, diethyl succinate, dipropyl succinate, diisopropyl succinate, dibutyl succinate, diisobutyl succinate, dioctyl succinate, diisononyl succinate, and diether compounds such as 9,9-bis(methoxymethyl)fluorine, 2-isopropyl-24 sopentyl-1,3-dimethoxypropane, 2,2-diisobutyl-1,3-dimethoxypropane, 2,2-diisopentyl-1,3-dimethoxypropane, 2-isopropyl-2-cyclohexyl-1,3-dimethoxypropane.

The electron donor compounds may be used individually or in combination. In employing the electron donor compounds, they do not have to be used directly as starting materials, but compounds convertible to the electron donors in the course of preparing solid precatalyst components may also be used as the starting materials.

Accordingly, in another aspect, a solid precatalyst component may be made by contacting a magnesium compound and a titanium compound with at least one electron donor compound of Formula (I).

In one embodiment, the solid precatalyst component is made by contacting a magnesium compound and a titanium compound in the presence of at least one electron donor compound of Formula (I). In another embodiment, the solid precatalyst component is made by forming a magnesium-based catalyst support crystal lattice optionally with a titanium compound and optionally with at least one electron donor compound of Formula (I), and contacting the magnesium-based catalyst support crystal lattice with the titanium compound and the electron donor compound. In yet another embodiment, the solid precatalyst component is made by contacting a magnesium-based support crystal lattice with a titanium compound to form a mixture, then contacting the mixture with at least one electron donor compound of Formula (I). In still yet another embodiment, the solid precatalyst component is made by contacting a magnesium-based support crystal lattice with a titanium compound to form a mixture, then contacting the mixture with at least one electron compound of Formula (I), then contacting the mixture again with the at least one electron donor compound of Formula (I). Such repeated contact with the at least one electron donor compound of Formula (I) can occur once, twice, three times, four times or more, successively or with other acts performed between contacts with additional doses of the at least one electron donor compounds of Formula (I).

Generally speaking, the magnesium-based support crystal lattice is made by dissolving a magnesium compound in a solvent mixture comprising an organic epoxy compound, an organic phosphorus compound and an optional inert diluent to form a homogenous solution.

The organic epoxy compounds include compounds having at least one epoxy group in the form of a monomers, a dimer, an oligomer, or a polymer. Examples of epoxy compounds include, but are not limited to, aliphatic epoxy compounds, alicyclic epoxy compounds, aromatic epoxy compounds, or the like. Examples of aliphatic epoxy compounds include, but are not limited to, halogenated aliphatic epoxy compounds, aliphatic epoxy compounds having a keto group, aliphatic epoxy compounds having an ether bond, aliphatic epoxy compounds having an ester bond, aliphatic epoxy compounds having a tertiary amino group, aliphatic epoxy compounds having a cyano group, or the like. Examples of cyclic epoxy compounds include, but are not limited to, halogenated alicyclic epoxy compounds, alicyclic epoxy compounds having a keto group, alicyclic epoxy compounds having an ether bond, alicyclic epoxy compounds having an ester bond, alicyclic epoxy compounds having a tertiary amino group, alicyclic epoxy compounds having a cyano group, or the like. Examples of aromatic epoxy compounds include, but are not limited to, halogenated aromatic epoxy compounds, aromatic epoxy compounds having a keto group, aromatic epoxy compounds having an ether bond, aromatic epoxy compounds having an ester bond, aromatic epoxy compounds having a tertiary amino group, aromatic epoxy compounds having a cyano group, or the like.

Specific examples of epoxy compounds include, but are not limited to, epifluorohydrin, epichlorohydrin, epibromohydrin, hexafluoropropylene oxide, 1,2-epoxy-4-fluorobutane, 1-(2,3-epoxypropyl)-4-fluorobenzene, 1-(3,4-epoxybutyl)-2-fluorobenzene, epoxypropyl)-4-chlorobenzene, 1-(3,4-epoxybutyl)-3-chlorobenzene, or the like. Specific examples of halogenated alicyclic epoxy compounds include 4-fluoro-1,2-cyclohexene oxide, 6-chloro-2,3 epoxybicyclo[2,2,1]heptane, or the like. Specific examples of halogenated aromatic epoxy compounds include 4-fluorostyrene oxide, 1-(1,2-epoxypropyl)-3-trifluorobenzene, or the like.

The organic phosphorus compounds may include, but are not limited to, hydrocarbyl esters and halohydrocarbyl esters of ortho-phosphoric acid and phosphorous acid. Specific examples include, but are not limited to, trimethyl phosphate, triethyl phosphate, tributyl phosphate, triphenyl phosphate, trimethyl phosphite, triethyl phosphite, tributyl phosphite and triphenyl phosphite.

To sufficiently dissolve a magnesium compound, an inert diluent may be added to the solvent mixture. The inert diluent can typically be aromatic hydrocarbons or alkanes, as long as it can facilitate the dissolution of the magnesium compound. Examples of aromatic hydrocarbons include, but are not limited to, benzene, toluene, xylene, chlorobenzene, dichlorobenzene, trichlorobenzene, chlorotoluene, and derivatives thereof. Examples of alkanes include linear, branched, or cyclic alkanes having about 3 to about 30 carbons, such as butane, pentane, hexane, cyclohexane, heptanes, and the like. These inert diluents may be used alone or in combination.

In embodiments of making the solid precatalyst component according to the Examples, the magnesium-based catalyst support crystal lattice is mixed with a titanium compound such as liquid titanium tetrahalide to recrystallize, optionally in the presence of an auxiliary recrystallization material. The auxiliary recrystallization material may be added before, during or after the recrystallization of the solids and loaded on the solids.

The auxiliary recrystallization material may include carboxylic acids, carboxylic acid anhydrides, ethers, ketones, or mixture thereof. Specific examples include, but are not limited to, acetic anhydride, phthalic anhydride, succinic anhydride, maleic anhydride, 1,2,4,5-benzene tetracarboxylic dianhydride, acetic acid, propionic acid, butyric acid, acrylic acid, methacrylic acid, acetone, methyl ethyl ketone, benzophenone, dimethyl ether, diethyl ether, dipropyl ether, dibutyl ether, and dipentyl ether.

The process of solids recrystallization may be carried out by at least one of three methods. One method includes mixing a titanium compound such as liquid titanium tetrahalide with a magnesium-based solution or mixture at a temperature from about −40° C. to about 0° C., and precipitating the solids while the temperature is raised slowly from about 30° C. to about 120° C., such as from about 60° C. to about 100° C. The second method involves adding a titanium compound drop-wise into a magnesium-based solution or mixture or support crystal lattice at low or room temperature to precipitate out solids immediately. The third method involves adding a first titanium compound drop-wise into a magnesium-based solution or mixture or support crystal lattice and mixing a second titanium compound with the magnesium solution or mixture or support crystal lattice. In these methods, an electron donor compound may be desirably present in the reaction system. At least one electron donor compound of Formula (I) may be added either after the magnesium-based support crystal lattice is obtained or after recrystallization.

In some embodiments, the solid precatalyst component may be granular and/or spherical. In some embodiments, the solid precatalyst component may be granular. In some embodiments, the solid precatalyst component may be spherical.

In one embodiment, when the solid precatalyst component is formed, a surfactant may be used. The surfactant can contribute to many of the beneficial properties of the solid precatalyst component and catalyst system. General examples of surfactants include polymer surfactants, such as polyacrylates, polymethacrylates, polyalkyl methacrylates, and the like. A polyalkyl methacrylate is a polymer that may contain one or more methacrylate monomers, such as at least two different methacrylate monomers, at least three different methacrylate monomers, etc. Moreover, the acrylate and methacrylate polymers may contain monomers other than acrylate and methacrylate monomers, so long as the polymer surfactant contains at least about 40% by weight acrylate and methacrylate monomers.

In one embodiment, non-ionic surfactants and/or anionic surfactants may be used. Examples of non-ionic surfactants and/or anionic surfactants include, but are not limited to, phosphate esters, alkyl sulfonates, aryl sulfonates, alkylaryl sulfonates, linear alkyl benzene sulfonates, alkylphenols, ethoxylated alcohols, carboxylic esters, fatty alcohols, fatty esters, fatty aldehydes, fatty ketones, fatty acid nitrites, benzene, naphthalene, anthracene, succinic anhydride, phthalic anhydrides, rosin, terpene, phenol, or the like. In fact, a number of anhydride surfactants are effective. In some instances, the absence of an anhydride surfactant causes the formation of very small catalyst support particles while the over-use creates straw shaped material sometimes referred to as needles.

The solid precatalyst precursor may be formed by the following method. In a solvent such as toluene, a magnesium and titanium containing solution is seen following the addition of a halogenating agent such as $TiCl_4$ into a magnesium-based solution at relatively cooler temperatures, such as −25° C. until about 0° C. An oil phase is then formed, which may be dispersed into the hydrocarbon phase that is stable until about 40° C. The resultant magnesium material becomes a semi-solid at this point and the particle morphology is now determined. The semi-solid converts to a solid between about 40° C. and about 80° C.

To facilitate obtaining uniform solid particles, the process of precipitation may be carried out slowly. When the second method of adding titanium halide drop-wise at low or room temperature is applied, the process may take place over a period from about 1 hour to about 6 hours. When the first method of raising the temperature in a slow manner is applied, the rate of temperature increase can be from about 4° C. to about 125° C. per hour.

The solid precipitate is first separated from the mixture. In the solid precipitate, thus obtained, may be entrained a variety of complexes and byproducts, so that further treatment may in some instances be necessary. In one embodiment, the solid precipitate is treated with a titanium compound to substantially remove the byproducts from the solid precipitate.

The solid precipitate may be washed with an inert diluent and then treated with a titanium compound or a mixture of a titanium compound and an inert diluent. The titanium compound used in this treatment may be identical to or different with the titanium compound used for forming the solid precipitate. The amount of titanium compound used is from about 1 to about 20 moles, such as from about 2 to about 15 moles, per mole of magnesium compound in the support. The treatment temperature is from about 50° C. to about 150° C., such as from about 60° C. to about 100° C. If a mixture of titanium tetrahalide and an inert diluent is used to treat the solid precipitate, the volume % of titanium tetrahalide in the treating solution is from about 10% to about 100%, the rest being the inert diluent.

The treated solids may be further washed with an inert diluent to remove ineffective titanium compounds and other byproducts. The inert diluent herein used may be hexane, heptanes, octane, 1,2-dichloroethane, benzene, toluene, ethylbenzene, xylene, and other hydrocarbons.

By treating the solid precipitate with the titanium compound and optionally an inert diluent, the byproducts in the solid precipitate may be removed from the solid precipitate. In one embodiment, the solid precipitate is treated with the titanium compound and optionally an inert diluent about two times or more and five times or less.

By treating the solid precipitate with an inert diluent, a free titanium compound in the solid precipitate may be removed from the solid precipitate. As a result, the resultant solid precipitate does not substantially contain a free titanium compound. In one embodiment, the solid precipitate is treated repeatedly with an inert diluent until the filtrate contains about 100 ppm or less of titanium. In another embodiment, the solid precipitate is treated repeatedly with an inert diluent until the filtrate contains about 50 ppm or less of titanium. In yet another embodiment, the solid precipitate is treated with an inert diluent until the filtrate contains about 10 ppm or less of titanium. In one embodiment, the solid precipitate is treated with an inert diluent about three times or more and seven times or less.

In one embodiment, the solid precatalyst component contains from about 0.5 to about 6.0 wt % titanium; from about 10 to about 25 wt % magnesium; from about 40 to about 70 wt % halogen; from about 1 to about 50 wt % of at least one of the electron donor compounds of Formula (I); and optionally inert diluent from about 0 to about 15 wt %. In another embodiment, the solid precatalyst component contains from about 2 to about 25 wt % of at least one of the electron donor compounds of Formula (I). In yet another embodiment, the solid precatalyst component contains from about 5 to about 20 wt % of at least one of the electron donor compounds of Formula (I).

The amounts of the ingredients used in preparing the solid precatalyst component may vary depending upon the method of preparation. In one embodiment, from about 0.01 to about 5 moles of at least one of the electron donor compounds of Formula (I) and from about 0.01 to about 500 moles of the titanium compounds are used per mole of the magnesium compound used to make the solid precatalyst component. In another embodiment, from about 0.05 to about 2 moles of at least one of the electron donor compounds of Formula (I) and from about 0.05 to about 300 moles of the titanium compounds are used per mole of the magnesium compound used to make the solid precatalyst component.

In one embodiment, in the solid precatalyst component, the atomic ratio of halogen/titanium is from about 4 to about 200; the electron donor/titanium mole ratio is from about 0.01 to about 10; and the magnesium/titanium atomic ratio is from about 1 to about 100. In another embodiment, in the solid cpreatalyst component, the atomic ratio of halogen/titanium is from about 5 to about 100; the electron donor/titanium mole ratio is from about 0.2 to about 6; and the magnesium/titanium atomic ratio is from about 2 to about 50.

The resulting solid precatalyst component generally contains a magnesium halide of a smaller crystal size than commercial magnesium halides and usually has a specific surface area of at least about 5 m$^2$/g, such as from about 10 to about 1,000 m$^2$/g, or from about 100 to about 800 m$^2$/g. Surface area may be measured according to the B.E.T. method. Since the above ingredients are unified to form an integral structure of the solid precatalyst component, the composition of the solid precatalyst component does not substantially change by washing with, for example, hexane.

The solid precatalyst component may be used after being diluted with an inorganic or organic compound such as a silicon compound, an aluminum compound, or the like.

The catalyst system may contain at least one organoaluminum compound in addition to the solid precatalyst component. Compounds having at least one aluminum-carbon bond in the molecule may be used as the organoaluminum compound. Examples of organoaluminum compounds include compounds of the following chemical formula (XII): $AlR_nX_{3-n}$(XII). In formula (XII), R independently represents a hydrocarbon group usually having 1 to about 20 carbon atoms, X represents a halogen atoms, and n is greater than 0, up to, and including, 3.

Specific examples of the organoaluminum compounds represented by formula (XII) include, but are not limited to, trialkyl aluminums such as triethyl aluminum, tributyl aluminum and trihexyl aluminum; trialkenyl aluminums such as triisoprenyl aluminum; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; alkyl aluminum dihalides such as ethyl aluminum dichloride, propyl aluminum dichloride and butyl aluminum dibromide; dialkyl aluminum hydrides such as diethyl aluminum hydride and dibutyl aluminum hydride; and other partially hydrogenated alkyl aluminum such as ethyl aluminum dihydride and propyl aluminum dihydride.

The organoaluminum compound is used in the catalyst system in an amount that the mole ratio of aluminum to titanium (from the solid precatalyst component) is from about 5 to about 1,000. In another embodiment, the mole ratio of aluminum to titanium in the catalyst system is from about 10 to about 700. In yet another embodiment, the mole ratio of aluminum to titanium in the catalyst system is from about 25 to about 400.

The catalyst system may contain at least one organosilicon compound in addition to the solid precatalyst component. This organosilicon compound is sometimes termed as an additional electron donor. The organosilicon compound as the additional electron donor may be an internal or external electron donor. The organosilicon compound contains silicon having at least one hydrocarbon group. General examples of hydrocarbon groups include alkyl groups, cycloalkyl groups, (cycloalkyl)methylene groups, alkene groups, aromatic groups, and the like.

The organosilicon compound, when used as an additional electron donor serving as one component of a Ziegler-Natta catalyst system for olefin polymerization, contributes to the ability to obtain a polymer (at least a portion of which is polyolefin) having a controllable molecular weight distribution and controllable crystallinity while retaining high performance with respect to catalytic activity.

The organosilicon compound is used in the catalyst system in an amount that the mole ratio of the organoaluminum compound to the organosilicon compound is from about 1 to about 200. In some embodiments, the mole ratio of the organoaluminum compound to the organosilicon compound is about 1 to about 100. In some embodiments, the mole ratio of the organoaluminum compound to the organosilicon compound is about 2 to about 90. In some embodiments, the mole ratio of the organoaluminum compound to the organosilicon compound is from about 5 to about 70. In some embodiments, the mole ratio of the organoaluminum compound to the organosilicon compound is about 1 to about 60. In yet another embodiment, the mole ratio of the organoaluminum compound to the organosilicon compound is from about 7 to about 35.

In one embodiment, the organosilicon compound is represented by chemical formula (XIII): $R_nSi(OR')_{4-n}$ (XIII) wherein each R and R' independently represent a hydrocarbon group, and n is from 0 to less than 4.

Specific examples of the organosilicon compound of formula (XIII) include, but are not limited to, trimethylmethoxysilane, trimethylethoxysilane, dimethyldimethoxysilane, dimethyldiethoxysilane, diisopropyldimethoxysilane, diisobutyldimethoxysilane, t-butylmethyldimethoxysilane, t-butylmethyldiethoxysilane, t-amylmethyldiethoxysilane, dicyclopentyldimethoxysilane, diphenyldimethoxysilane, phenylmethyldimethoxysilane, diphenyldiethoxysilane, bis-o-tolydimethoxysilane, bis-m-tolydimethoxysilane, bis-p-tolydimethoxysilane, bis-p-tolydiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltriethoxysilane, ethyltriethoxysilane, vinyltriethoxysilane, t-butyltriethoxysilane, n-butyltriethoxysilane, isobutyltriethoxysilane, phenyltriethoxysilane, gamma-aminopropyltriethoxysilane, cholotriethoxysilane, ethyltriisopropoxysilane, vinyltirbutoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, and methyltriallyloxysilane.

In another embodiment, the organosilicon compound is represented by chemical Formula (XIV): $SiRR'_m(OR'')_{3-m}$ (XIV). In Formula (XIV), m is from 0 to less than 3, such as from 0 to about 2; and R independently represents a cyclic hydrocarbon or substituted cyclic hydrocarbon group. Illustrative examples of R include, but are not limited to, cyclopropyl; cyclobutyl; cyclopentyl; 2-methylcyclopentyl; 3-methylcyclopentyl; 2-ethylcyclopentyl; 3-propylcyclopentyl; 3-isopropylcyclopentyl; 3-butylcyclopentyl; 3-tertiary butyl cyclopentyl; 2,2-dimethylcyclopentyl; 2,3-dimethylcyclopentyl; 2,5-dimethylcyclopentyl; 2,2,5-trimethylcyclopentyl; 2,3,4,5-tetramethylcyclopentyl; 2,2,5,5-tetramethylcyclopentyl; 1-cyclopentylpropyl; 1-methyl-1-cyclopentyl ethyl; cyclopentenyl; 2-cyclopentenyl; 3-cyclopentenyl; 2-methyl-1-cyclopentenyl; 2-methyl-3-cyclopentenyl; 3-methyl-3-cyclopentenyl; 2-ethyl-3-cyclopentenyl; 2,2-dimethyl-3-cyclopentenyl; 2,5-dimethyl-3-cyclopentenyl; 2,3,4,5-tetramethyl-3-cyclopentenyl; 2,2,5,5-tetramethyl-3-cyclopentenyl; 1,3-cyclopentadienyl; 2,4-cyclopentadienyl; 1,4-cyclopentadienyl; 2-methyl-1,3-cyclopentadienyl; 2-methyl-2,4-cyclopentadienyl; 3-methyl-2,4-cyclopentadienyl; 2-ethyl-2,4-cyclopentadienyl; 2,2-dimethyl-2,4-cyclopentadienyl; 2,3-dimethyl-2,4-cyclopentadienyl; 2,5-dimethyl-2,4-cyclopentadienyl; 2,3,4,5-tetramethyl-2,4-cyclopentadienyl; indenyl; 2-methylindenyl; 2-ethylindenyl; 2-indenyl; 1-methyl-2-indenyl; 1,3-dimethyl-2-indenyl; indanyl; 2-methylindanyl; 2-indanyl; 1,3-dimethyl-2-indanyl; 4,5,6,7-tetrahydroindenyl; 4,5,6,7-tetrahydro-2-indenyl; 4,5,6,7-tetrahydro-1-methyl-2-indenyl; 4,5,6,7-tetrahydro-1,3-dimethyl-2-indenyl; fluorenyl groups; cyclohexyl; methylcyclohexyls; ethylcylcohexyls; propylcyclohexyls; isopropylcyclohexyls; n-butylcyclohexyls; tertiary-butyl cyclohexyls; dimethylcyclohexyls; and trimethylcyclohexyls.

In Formula (XIV), R' and R" are identical or different and each represents a hydrocarbons. Examples of R' and R" are alkyl, cycloalkyl, aryl and aralkyl groups having 3 or more carbon atoms. Furthermore, R and R' may be bridged by an alkyl group, etc. General examples of organosilicon compounds are those of Formula (XIV) in which R is cyclopentyl group, R' is an alkyl group such as methyl or cyclopentyl group, and R" is an alkyl group, particularly a methyl or ethyl group.

Specific examples of organosilicon compound of formula (XIV) include, but are not limited to, trialkoxysilanes such as cyclopropyltrimethoxysilane, cyclobutyltrimethoxysilane, cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane, indenyltrimethoxysilane and fluorenyltrimethoxysilane;

dialkoxysilanes such as dicyclopentyldimethoxysilane, bis(2-methylcyclopentyl)dimethoxysilane, bis(3-tertiary butylcyclopentyl)dimethoxysilane, bis(2,3-dimethylcyclopentyl)dimethoxysilane, bis(2,5-dimethylcyclopentyl)dimethoxysilane, dicyclopentyldiethoxysilane, dicyclobutyldiethoxysilane, cyclopropylcyclobutyldiethoxysilane, dicyclopentenyldimethoxysilane, di(3-cyclopentenyl)dimethoxysilane, bis(2,5-dimethyl-3-cyclopentenyl)dimethoxysilane, di-2,4-cyclopentadienyl)dimethoxysilane, bis(2,5-dimethyl-2,4-cyclopentadienyl)dimethoxysilane, bis(1-methyl-1-cyclopentylethyl)dimethoxysilane, cyclopentylcyclopentenyldimethoxysilane, cyclopentylcyclopentadienyldimethoxysilane, diindenyldimethoxysilane, bis(1,3-dimethyl-2-indenyl)dimethoxysilane, cyclopentadienylindenyldimethoxysilane, difluorenyldimethoxysilane, cyclopentylfluorenyldimethoxysilane and indenylfluorenyldimethoxysilane; monoalkoxysilanes such as tricyclopentylmethoxysilane, tricyclopentenylmethoxysilane, tricyclopentadienylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, bis(2,5-dimethylcyclopentyl)cyclopentylmethoxysilane, dicyclopentylcyclopentenylmethoxysilane, dicyclopentylcyclopentenadienylmethoxysilane and diindenylcyclopentylmethoxysilane; and ethylenebis-cyclopentyldimethoxysilane.

Polymerization of olefins may be carried out in the presence of the catalyst system described above. Generally speaking, olefins are contacted with the catalyst system described above under suitable conditions to form desired polymer products. In one embodiment, preliminary polymerization described below is carried out before the main polymerization. In another embodiment, polymerization is carried out without preliminary polymerization. In yet another embodiment, the formation of copolymer is carried out using at least two polymerization zones.

In preliminary polymerization, the solid precatalyst component is usually employed in combination with at least a portion of the organoaluminum compound. This may be carried out in the presence of part or the whole of the additional electron donor compound. The concentration of the catalyst system used in the preliminary polymerization may be much higher than that in the reaction system of the main polymerization.

In preliminary polymerization, the concentration of the solid precatalyst component in the preliminary polymerization is usually from about 0.01 to about 200 millimoles, preferably from about 0.05 to about 100 millimoles, calculated as titanium atoms per liter of an inert hydrocarbon medium described below. In one embodiment, the preliminary polymerization is carried out by adding an olefin and the above catalyst system ingredients to an inert hydrocarbon medium and polymerizing the olefin under mild conditions.

Specific examples of the inert hydrocarbon medium include, but are not limited to, mineral oil, petroleum jelly, aliphatic hydrocarbons such as propane, butane, pentane, hexane, heptanes, octane, decane, dodecane and kerosene; alicyclic hydrocarbons such as cyclopentane, cyclohexane and methylcyclopentane; aromatic hydrocarbons such as benzene, toluene and xylene; and mixtures thereof. A liquid olefin may be used in place of part or the whole of the inert hydrocarbon medium.

The olefin used in the preliminary polymerization may be the same as, or different from, an olefin to be used in the main polymerization.

The reaction temperature for the preliminary polymerization is sufficient for the resulting preliminary polymer to not substantially dissolve in the inert hydrocarbon medium. In one embodiment, the temperature is from about −20° C. to about 100° C. In another embodiment, the temperature is from about −10° C. to about 80° C. In yet another embodiment, the temperature is from about 0° C. to about 40° C.

Optionally, a molecular-weight controlling agent, such as hydrogen, may be used in the preliminary polymerization. The molecular weight controlling agent is used in such an amount that the polymer obtained by the preliminary polymerization has an intrinsic viscosity, measured in decalin at 135° C., of at least about 0.2 dl/g, and preferably from about 0.5 to 10 dl/g.

In one embodiment, the preliminary polymerization is desirably carried out so that from about 0.1 g to about 1,000 g of a polymer is formed per gram of the solid catalyst component of the catalyst system. In another embodiment, the preliminary polymerization is desirably carried out so that from about 0.3 g to about 500 g of a polymer is formed per gram of the solid catalyst component. If the amount of the polymer formed by the preliminary polymerization is too large, the efficiency of producing the olefin polymer in the main polymerization may sometimes decrease, and when the resulting olefin polymer is molded into a film or another article, fish eyes tend to occur in the molded article. The preliminary polymerization may be carried out batchwise or continuously.

After the preliminary polymerization conducted as above, or without performing any preliminary polymerization, the main polymerization of an olefin is carried out in the presence of the above-described olefin polymerization catalyst system formed from the solid precatalyst component, the organoaluminum compound and the organosilicon compound (external electron donor compound).

Examples of olefins that may be used in the main polymerization are α-olefins having 2 to 20 carbon atoms such as ethylene, propylene, 1-butene, 4-methyl-1-pentene, 1-pentene, 1-octene, 1-hexene, 1-octene, 3-methyl-1-pentene, 3-methyl-1-butene, 1-decene, 1-tetradecene, 1-eicosene, and vinylcyclohexane. In the process, these α-olefins may be used individually or in any combination. In some embodiments the olefin may be ethylene, propylene, or mixtures thereof. In some embodiments, the olefin may be ethylene. In certain specific embodiments, the olefin may be propylene.

In particular embodiments, propylene or 1-butene is homopolymerized, or a mixed olefin containing propylene or 1-butene as a main component is copolymerized. When the mixed olefin is used, the proportion of propylene or 1-butene as the main component is usually at least about 50 mole %, preferably at least about 70 mole %.

By performing the preliminary polymerization, the catalyst system in the main polymerization may be adjusted in the degree of activity. This adjustment tends to result in a powdery polymer having a high bulk density. Furthermore, when the preliminary polymerization is carried out, the particle shape of the resulting polymer are replicas of the precatalyst particle morphology, and in the case of slurry polymerization, the slurry attains excellent characteristics while in the case of gas phase polymerization, the polymer seed bed attains excellent characteristics. Furthermore, in these embodiments, a polymer having a high stereoregularity index may be produced with a high catalytic efficiency by polymerizing an α-olefin having at least 3 carbon atoms. Accordingly, when producing the propylene copolymer, the resulting copolymer powder or the copolymer becomes easy to handle.

In the homopolymerization of these olefins, a polyunsaturated compound such as conjugated diene or non-conjugated diene may be used as a comonomer. Examples of comonomers include styrene, butadiene, acrylonitrile, acrylamide, α-methyl styrene, chlorostyrene, vinyl toluene, divinyl benzene, diallylphthalate, alkyl methacrylates and alkyl acrylates. In one embodiment, the comonomers include thermoplastic and elastomeric monomers.

The main polymerization of an olefin is carried out usually in the gaseous or liquid phase. In one embodiment, polymerization (main polymerization) employs a catalyst system containing the solid precatalyst component in an amount from about 0.001 to about 0.75 millimoles calculated as Ti atom per liter of the volume of the polymerization zone, the organoaluminum compound in an amount from about 1 to about 2,000 moles per mole of titanium atoms in the solid precatalyst component, and the organosilicon compound in an amount from about 0.001 to about 10 moles calculated as Si atoms in the organosilicon compound per mole of the metal atoms in the organoaluminum compound. In another embodiment, polymerization employs a catalyst system containing the solid precatalyst component in an amount of from 0.005 to about 0.5 millimoles calculated as Ti atom per liter of the volume of the polymerization zone, the organoaluminum compound in an amount from about 5 to about 500 moles per mole of titanium atoms in the solid precatalyst component, and the organosilicon compound in an amount from about 0.01 to about 2 moles calculated as Si atoms in the organosilicon compound per mole of the metal atoms in the organoaluminum compound. In yet another embodiment, polymerization employs a catalyst system containing the alkyl benzoate derivative in an amount from about 0.005 to about 1 mole calculated as Si atoms in the organosilicon compound per mole of the metal atoms in the organoaluminum compound.

When the organoaluminum compound and the additional electron donor compound are used partially in the preliminary polymerization, the catalyst system subjected to the preliminary polymerization is used together with the remainder of the catalyst system components. The catalyst system subjected to the preliminary polymerization may contain the preliminary polymerization product.

The use of hydrogen at the time of polymerization promotes and contributes to control of the molecular weight of the resulting polymer, and the polymer obtained may have a high melt flow rate. In this case, the stereoregularity index of the resulting polymer and the activity of the catalyst system are generally increased.

In one embodiment, the polymerization temperature is from about 20° C. to about 200° C. In another embodiment, the polymerization temperature is from about 50° C. to about 180° C. In one embodiment, the polymerization pressure is typically from atmospheric pressure to about 100 kg/cm². In another embodiment, the polymerization pressure is typically from about 2 kg/cm² to about 50 kg/cm². The main polymerization may be carried out batchwise, semi-continuously or continuously. The polymerization may also be carried out in two or more stages under different reaction conditions.

The olefin polymer so obtained may be a homopolymer, a random copolymer, a block copolymer or an impact copolymer. The impact copolymer contains an intimate mixture of a polyolefin homopolymer and a polyolefin rubber. Examples of polyolefin rubbers include ethylene propylene rubber (EPR) such as ethylene propylene methylene copolymer rubber (EPM) and ethylene propylene diene methylene terpolymer rubber (EPDM).

The olefin polymer obtained by using the catalyst system has a very small amount of an amorphous polymer component and therefore a small amount of a hydrocarbon-soluble component. Accordingly, a film molded from the resultant polymer has low surface tackiness.

The polyolefin obtained by the polymerization process is excellent in particle size distribution, particle diameter and bulk density, and the copolyolefin obtained has a narrow composition distribution. In an impact copolymer, excellent fluidity, low temperature resistance, and a desired balance between stiffness and elasticity may be obtained.

In one embodiment, propylene and an α-olefin having 2 or from about 4 to about 20 carbon atoms are copolymerized in the presence of the catalyst system described above. The catalyst system may be one subjected to the preliminary polymerization described above. In another embodiment, propylene and an ethylene rubber are formed in two or more reactors coupled in series to form an impact polymer.

The α-olefin having 2 carbon atoms is ethylene, and examples of the α-olefin having about 4 to about 20 carbon atoms are 1-butene, 1-pentene, 4-methyl-1-pentene, 1-octene, 1-hexene, 3-methyl-1-pentene, 3-methyl-1-butene, 1-decene, vinylcyclohexane, 1-tetradecene, and the like.

In the main polymerization, propylene may be copolymerized with two or more such α-olefins. For example, it is possible to copolymerize propylene with ethylene and 1-butene. In one embodiment, propylene is copolymerized with ethylene, 1-butene or ethylene and 1-butene.

Block copolymerization of propylene and another α-olefin may be carried out in two stages. The polymerization in a first stage may be the homopolymerization of propylene or the copolymerization of propylene with the other α-olefin. In one embodiment, the amount of the monomers polymerized in the first stage is from about 50 to about 95% by weight. In another embodiment, the amount of the monomers polymerized in the first stage is from about 60 to about 90% by weight. This first stage polymerization may, as required be carried out in two or more stages under the same or different polymerization conditions.

In one embodiment, the polymerization in a second stage is desirably carried out such that the mole ratio of propylene to the other α-olefin(s) is from about 10/90 to about 90/10. In another embodiment, the polymerization in a second stage is desirably carried out such that the mole ratio of propylene to the other α-olefin(s) is from about 20/80 to about 80/20. In yet another embodiment, the polymerization in a second stage is desirably carried out such that the mole ratio of propylene to the other α-olefin(s) is from about 30/70 to about 70/30. Producing a crystalline polymer or copolymer of another α-olefin may be provided in the second polymerization stage.

The propylene copolymer so obtained may be a random copolymer or the above-described block copolymer. This propylene copolymer typically contains from about 7 to about 50 mole % of units derived from the α-olefin having 2 or from about 4 to about 20 carbon atoms. In one embodiment, a propylene random copolymer contains from about 7 to about 20 mole % of units derived from the α-olefin having 2 or from about 4 to about 20 carbon atoms. In another embodiment, the propylene block copolymer contains from about 10 to about 50 mole % of units derived from the α-olefin having 2 or 4-20 carbon atoms.

In another embodiment, copolymers made with the catalyst system contain from about 50% to about 99% by weight poly-α-olefins and from about 1% to about 50% by weight comonomers (such as thermoplastic or elastomeric monomers). In another embodiment, copolymers made with the catalyst system contain from about 75% to about 98% by weight poly-α-olefins and from about 2% to about 25% by weight comonomers.

It should be understood that where there is no reference to the polyunsaturated compound that may be used, the method of polymerization, the amount of the catalyst system and the polymerization conditions, the same description as the above embodiment are applicable.

The catalysts/methods may be in some instances lead to the production of homopolymerized poly-α-olefins having xylene soluble (XS) from about 0.5% to about 10%. In another embodiment, homopolymerized poly-α-olefins having xylene soluble (XS) from about 1.5% to about 8% are produced. In another embodiment, poly-α-olefins having xylene soluble (XS) from about 2.5% to about 5% are produced. XS refers to the percent of solid polymer that dissolves into xylene. A low XS % value generally corresponds to a highly isotactic homopolymer (i.e. higher crystallinity), whereas a high XS % value generally corresponds to a low isotactic polymer.

The poly-α-olefins produced using the catalysts and methods described herein may exhibit an elution temperature at the maximum crystalline peak ($T_{el,\ max}$) from about 50° C. to about 200° C. In another embodiment, poly-α-olefins having an elution temperature at the maximum crystalline peak ($T_{el,\ max}$) from about 90° C. to about 150° C. In another embodiment, poly-α-olefins having an elution temperature at the maximum crystalline peak ($T_{el,\ max}$) from about 100° C. to about 125° C. A high elution temperature at the maximum crystalline peak ($T_{el,\ max}$) refers to a high isotactic polymer (i.e. high crystallinity).

The poly-α-olefins produced using the catalysts and methods described herein, may exhibit a number average molecular weight ($M_n$) from about 20 kg/mol to about 200 kg/mol. In some embodiments, the $M_n$ may be from about 25 kg/mol to 150 kg/mol. In some embodiments, the $M_n$ may be from about 30 kg/mol to 100 kg/mol. The poly-α-olefins produced using the catalysts and methods described herein, may exhibit a weight average molecular weight ($M_w$) from about 150 kg/mol to about 800 kg/mol. In some embodiments, the $M_w$ may be from about 250 kg/mol to about 700 kg/mol. In some embodiments, the Mn may be from about 300 kg/mol to about 650 kg/mol.

The poly-α-olefins produced using the catalysts and methods described herein, may exhibit a polydispersity index (PDI) (calculated as: $M_w/M_n$) from about 3 to about 15. In some embodiments, the PDI may be from about 3.5 to about 12.5. In some embodiments, the PDI may be from about 4.0 to about 10.

In one embodiment, the catalyst efficiency in bulk slurry polymerization (measured as kilogram of polymer produced per gram of catalyst) of the catalyst system is at least about 30. In another embodiment, the catalyst efficiency of the catalyst system is at least about 60.

The catalysts/methods may in some instances lead to the production of poly-α-olefins having melt flow indexes (MFI) from about 0.1 to about 200. The MFI is measured according to ASTM standard D1238. In another embodiment, poly-α-olefins having an MFI from about 5 to about 100 are produced. In one embodiment, an impact polypropylene-ethylenepropylene rubber product has an MFI from about 0.1 to about 200. In another embodiment, an impact polypropylene-ethylenepropylene rubber product has an MFI from about 0.1 to about 100.

The catalysts/methods may in some instances lead to the production of poly-α-olefins having bulk densities (BD) of at least about 0.3 cc/g. In another embodiment, poly-α-olefins having a BD of at least about 0.4 cc/g are produced.

In one embodiment, an impact polypropylene-ethylenepropylene rubber product having a BD of at least about 0.3 cc/g is produced. In another embodiment, an impact polypropylene-ethylenepropylene rubber product having a BD of at least about 0.4 cc/g is produced.

The catalysts/methods lead to the production of poly-α-olefins having a relatively narrow molecular weight distribution. Polydispersity Index (PI) is strictly connected with the molecular weight distribution of the polymer. PI is obtained from plotting the crossover of shear storage modulus (G') to loss modulus (G"). In one embodiment, the PI of a polypropylene polymer made with the catalyst system is from about 2 to about 20. In another embodiment, the PI of a polypropylene polymer made with the catalyst system is from about 5 to about 15.

Propylene block copolymers and impact copolymers may be prepared by the present methods, including the preparation of polypropylene-based impact copolymers having one or more enhanced properties in melt-flowability, moldability desirable balance between rigidity and elasticity, good stereospecific control, good control over polymer particle size, shape, size distribution, and molecular weight distribution, and impact strength with a high catalytic efficiency and/or good operability. Employing the catalyst systems containing the solid precatalyst component yields catalysts simultaneously having high catalytic efficiency, and one or more of excellent melt-flowability, extrudability, moldability, rigidity-elasticity and impact strength.

The present invention, thus generally described, will be understood more readily by reference to the following examples, which are provided by way of illustration and are not intended to be limiting of the present invention.

EXAMPLES

General. Exemplary compounds used as internal or external electron donors are shown in Table 1, vide infra.

TABLE 1

| | |
|---|---|
| Non-phthalate Electron Donors | |
| Donor Number | Structure |
| 1 | Silolane-1,1-diylbis(methylene) dibenzoate |

TABLE 1-continued
Non-phthalate Electron Donors
| Donor Number | Structure |
|---|---|
| 2 | 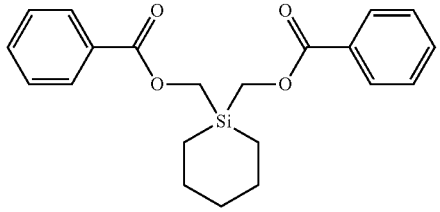<br>Silinane-1,1-diylbis(methylene) dibenzoate |
| 3 | 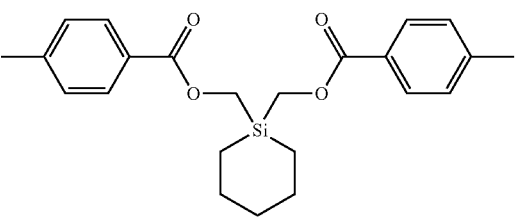<br>Silinane-1,1-diylbis(methylene) bis(4-methylbenzoate) |
| 4 | 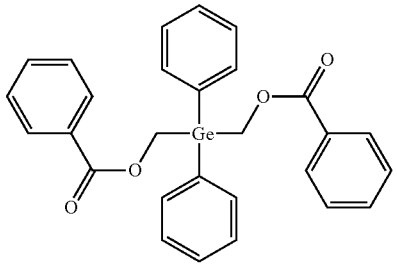<br>(Diphenylgermanediyl)bis(methylene) dibenzoate |
| 5 | 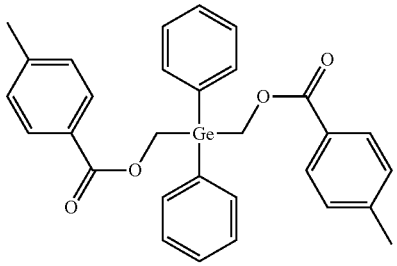<br>(Diphenylgermanediyl)bis(methylene) bis(4-methylbenzoate) |
| 6 | 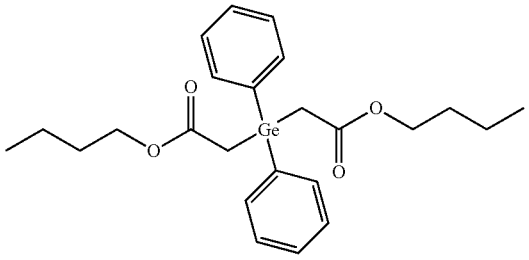<br>Dibutyl 2,2'-(diphenylgermanediyl)diacetate |

TABLE 1-continued

Non-phthalate Electron Donors

| Donor Number | Structure |
|---|---|
| 7 | (Dibutylgermanediyl)bis(methylene) dibenzoate |
| 8 | siletane-1,1-diylbis(methylene) dibenzoate |
| 9 | silinane-1,1-diylbis(methylene) bis(furan-2-carboxylate) |

Example 1: Preparation of Exemplary Electron Donors

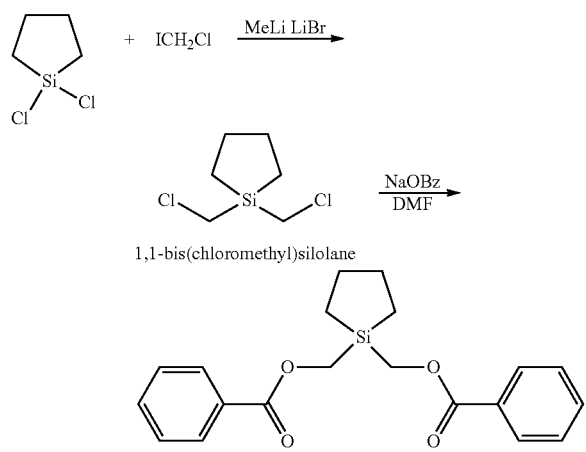

Preparation of electron donor 1. Electron Donor 1 was prepared as illustrated in Scheme 1. A Schlenk tube was charged with cyclotetramethylenedichlorosilane (1.3 mL), chloroiodomethane (2.0 mL), THF (50 mL) and cooled to −78° C. MeLi LiBr (27 mL, 1.6 M in hexane) was added dropwise over 30 min. The reaction solution was then warmed to room temperature in 1 h. The resulting solution was quenched by NH$_4$Cl solution and standard workup afforded intermediate 1,1-bis(chloromethyl)silolane as a colorless liquid. A round bottomed flask was charged with DMF (40 mL), 1,1-bis(chloromethyl)silolane (1.6 g), and sodium benzoate (6 g) and stirred under 100° C. overnight. Electron donor 1 (4.2 g) was obtained as a a colorless syrup after workup.

Preparation of electron donor 2. A Schlenk tube was charged with cyclopentamethylenedichlorosilane (3.0 mL), chloroiodomethane (4.0 mL), THF (50 mL) and cooled to −78° C. MeLi LiBr (54 mL, 1.6 M in hexane) was added dropwise over 30 min. Then the reaction solution was warmed to room temperature in 1 h. The resulting solution was quenched by NH$_4$Cl solution and standard workup afforded intermediate 1,1-bis(chloromethyl)silinane as a colorless liquid. A round bottomed flask was charged with DMF (40 mL), 1,1-bis(chloromethyl)silinane (3.3 g), and sodium benzoate (14 g) and stirred under 100° C. overnight. Electron donor 2 (4.0 g) was obtained as a colorless syrup after workup.

Scheme 2

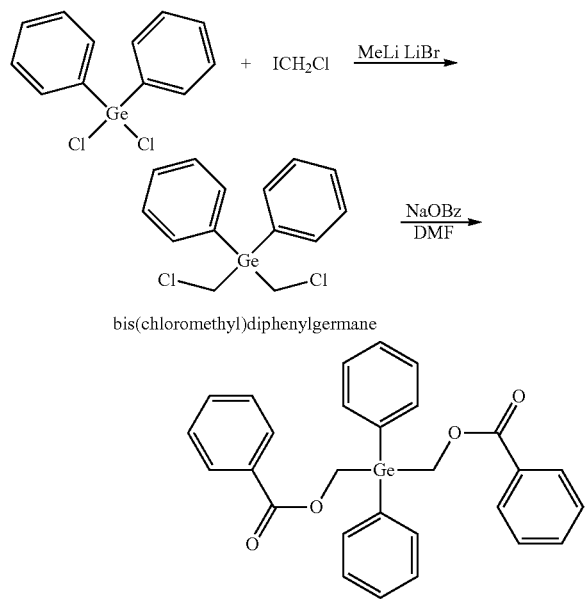

bis(chloromethyl)diphenylgermane

Preparation of electron donor 4. Electron Donor 4 was prepared as illustrated in Scheme 2. A Schlenk tube was charged with diphenyldichlorogermane (2.1 mL), chloroiodomethane (2.0 mL), THF (20 mL) and cooled to −78° C. MeLi LiBr (27 mL, 1.6 M in hexane) was added dropwise over 30 min. The reaction solution was then warmed to room temperature in 1 h. The resulting solution was quenched by NH₄Cl solution and standard workup afforded intermediate as a colorless liquid. A round bottomed flask was charged with DMF (40 mL), bis(chloromethyl)diphenylgermane (3.08 g), and sodium benzoate (16 g) and stirred under 100° C. overnight. Electron donor 4 (3.05 g) was obtained as a white solid after workup.

Scheme 3

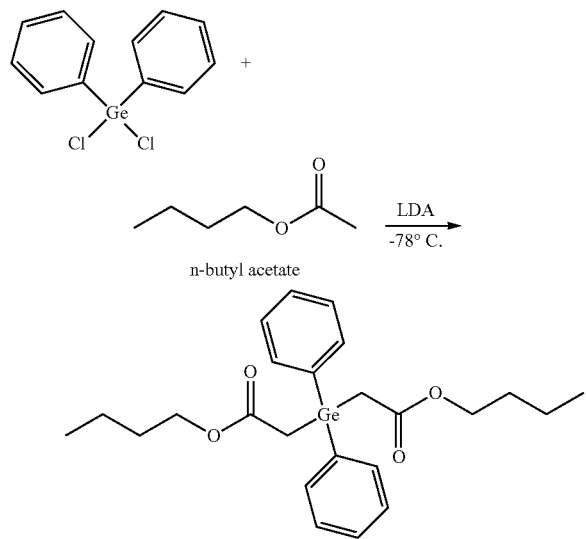

Preparation of electron donor 6. Electron Donor 6 was prepared as illustrated in Scheme 3. A Schlenk tube was charged with THF (30 mL) and LDA (30 mmol, 15 mL) with a stir bar and cooled to −78° C. n-Butyl acetate (3.3 mL) was added in 20 min. Then diphenyldichlorogermane (2.0 mL) in 15 mL THF was added dropwise over 20 min. After stirring at −78° C. for 1 h, NH₄Cl solution was added to quench the reaction. Standard workup afforded electron donor 6 as a light yellow syrup.

The remaining electron donors were synthesized using the procedures described above.

Preparation of solid precatalyst component using electron donors of the present technology. Solid precatalyst components as described in the present technology are prepared using the general methods described herein and the exemplary electron donors of formula (I). 3.3 g $MgCl_2$, 0.8 g phthalic anhydride, 6.41 g epichlorohydrin, 6.70 g tributylphosphate, and 50.92 g toluene were charged to a 250 ml reactor under nitrogen. The mixture was heated to 60° C. and agitated at 400 rpm for 2 hours. The mixture was then cooled to −30° C. and 65 g $TiCl_4$ were added while maintaining the reactor at −25° C. during the addition. The agitation was reduced to 200 rpm and the reactor was heated to 85° C. over two hours. After reaching temperature, the agitation was increased to 400 rpm for 30 minutes, and 0.6 g of donor (I) was added and stirred for one hour, followed by filtration. Toluene (38 ml) and 0.4 g of donor (I) were added to the reactor and the mixture was heated to 85° C. at 400 rpm, stirred for one hour, and filtered. The heat was turned off, and the mixture was washed with 65 ml toluene and filtered. Another 65 ml toluene was added and the mixture was held under nitrogen overnight without stirring. The toluene was removed by filtering, and 66.25 ml of 10% wt $TiCl_4$-toluene was added prior to heating the mixture to 95° C. with stirring at 400 rpm for one hour, followed by filtration. The previous step was repeated 3 times at 110° C., 400 rpm, and 30 minute each. The final catalyst was washed 4 times with 65 ml hexane and collected as a hexane slurry.

Example 2. Exemplary polymerization with Electron Donors. The prepared precatalysts were used for propylene polymerization conditions using the following exemplary procedure. Propylene polymerization was performed in a one gallon reactor. The reactor was purged at 100° C. under nitrogen for one hour. At room temperature, 1.5 ml of 25 wt % TEAL (triethylaluminum) in heptane was added into the reactor. Next, 0.94 ml of 0.0768 M solution of cyclohexyl methyl dimethoxy silane (donor C) was added into the reactor followed by 7.0 mg precatalyst as 1 wt % hexane slurry. The reactor was charged with 5 standard liter $H_2$ followed by 1300 g propylene. The reactor was heated to 70° C. and held at at that temperature for one hour. The polymerization was quenched by venting the reactor and the polymer was recovered.

A number of the electron donors listed in Table 1 were similarly tested, with results tabulated in Table 2. The ranges for CE, % XS, and MFR are based on results obtained from different runs.

TABLE 2

Polymerization Data For the Electron Donors 1-7

| Donor Number | CE | % XS | MFR | PI |
|---|---|---|---|---|
| 1 | 30.6-31.4 | 2.63-2.86 | 0.76-0.35 | N/A |
| 2 | 31.9-33.3 | 3.37-3.48 | 0.26-0.6 | N/A |
| 3 | 37.8-43.9 | 2.11-2.18 | 0.08-.026 | N/A |
| 4 | 34.8-39.6 | 2.42-3.4 | 0.3 | 6.32 |
| 5 | 40.7 | 2.06 | 0.14 | N/A |

TABLE 2-continued

Polymerization Data For the Electron Donors 1-7

| Donor Number | CE | % XS | MFR | PI |
|---|---|---|---|---|
| 6 | 23 | 3.57 | 7.83 | N/A |
| 7 | 44.4 | 1.87 | 0.12 | N/A |

CE = Catalyst Activity (kg polymer/g catalyst/hour)
% XS = Xylene Soluble
MFR = Melt Flow Rate (g polymer/10 min.)
PI = Polydispersity Index
N/A—Not Available Example 3. Exemplary polymerization using Electron Donor 4: A general polymerization procedure is carried out in a reactor cell equipped with magnetically coupled mechanical stirrer, having a geometric volume of approximately 23 mL and a working volume of approximately 5 mL for the liquid phase. The cell is initially purged under intermittent nitrogen flow at 90-140° C. for 8 h. The cell is cooled to room temperature and fitted with disposable 10 mL glass and stir paddles. An amount of dried heptane is then fed through a syringe pump to the reactor system along with TEAL as scavenger and $H_2$ (p$H_2$ varies from 0.03-0.2 bar) at a temperature of 70° C. and operating pressure with propene (total reactor pressure is 5.5 bar). Under these conditions using a slurry needle system the test amount of precatalyst in heptane slurry (approx. 0.1 mg) and the solution TEAl/additional external electron donor in heptane is injected into the cell, starting the polymerization reaction under constant pressure by feeding propene and stirring (800 rpm) for 30 min. The reaction is quenched by over-pressurizing the system with dry air; the reactor is cooled to room temperature and vented. The glass cell is removed from the reactor, the solvent is evaporated in a centrifugal evaporator, and the obtained polymer is dried under vacuum overnight.

The polymerization conditions (each performed in duplicate) were varied as shown in Table 3 and the resultant yield of polymer per run determined.

TABLE 3

Polymerization conditions for Electron Donor 4

| Condition | p$H_2$ (bar) | Si/Ti molar ratio | Al/Si molar ratio | Yield (mg) | CE (kg/g.h) |
|---|---|---|---|---|---|
| 1 | 0.02 | 28 | 7.5 | 130, 125 | 3.3, 3.1 |
| 2 | 0.02 | 14 | 15 | 133, 137 | 3.3, 3.4 |
| 3 | 0.02 | 5 | 40 | 164, 149 | 4.1, 3.7 |
| 4 | 0.02 | 2 | 100 | 143, 154 | 3.6, 3.9 |

Figure 2:
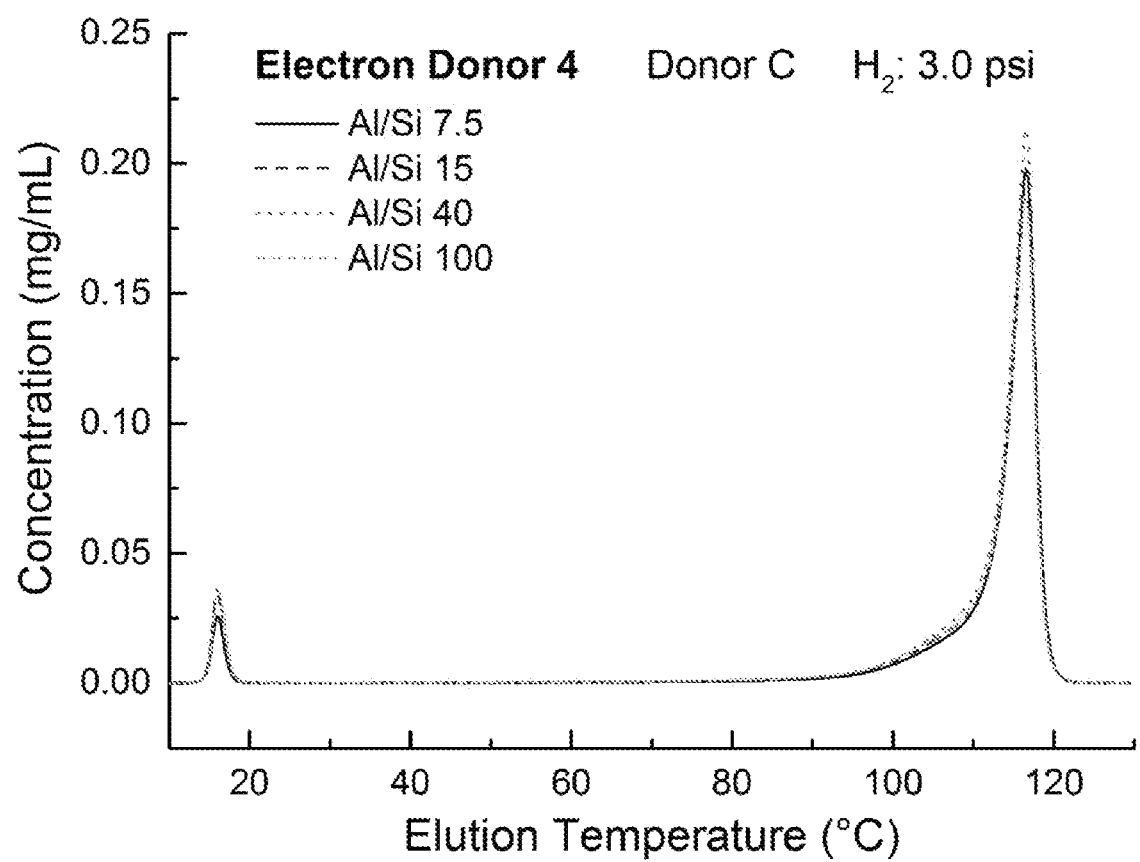
FIG. 2 provides a plot of the CEF diagram of Al/Si concentration versus elution temperature at the maximum crystalline peak ($T_{el,\ max}$), according to the examples.

The polymers obtained and shown in Table 3 above were characterized by crystallization elution fractionation (CEF) and high-temperature size exclusion chromatography (HSEC). CEF analysis determines the amorphous fraction of the polymer, and is expected to be homologous to the traditional xylene soluble (XS) fraction. See *Ind. Eng. Chem. Res.* 55(10):2686-2695 (2016). The CEF analysis also provides a correlation of the degree of isotacticity of the crystalline fraction with the elution temperature at the maximum crystalline peak ($T_{el, max}$). FIG. 1 is a CEF diagram of Al/Si versus the amorphous fraction, which correlates with the amount of the soluble fraction of the produced polymer. FIG. 1 also provides a CEF diagram of Al/Si versus elution temperature at the maximum crystalline peak. Thus, as the amount of external donor is reduced, the amorphous fraction increases with a concurrent decrease in the crystalline fraction under the polymerization conditions listed in Table 3. The results of the CEF analysis for each of the reaction conditions 1-4 are provided in Table 4. FIG. 2 provides a plot of the CEF diagram of Al/Si concentration versis temperature at the maximum crystalline peak ($T_{el, max}$), which correlates with degree of isotacticity of the highly crystalline fraction of the polymer.

TABLE 4

Results of CEF analysis of polymers obtained from reaction conditions 1-4

| | | p$H_2$: 0.02 bar | |
|---|---|---|---|
| Condition | Al/Si | XS (%) | $T_{el,max}$ (° C.) |
| 1 | 7.5 | 4.5 | 116.5 |
| 2 | 15 | 5.5 | 116.5 |
| 3 | 40 | 5.4 | 116.5 |
| 4 | 100 | 6.1 | 116.4 |

HSEC analysis was used to determine polymer molecular weight and molecular weight distribution. All results were carried out in duplicate and are provided in Table 5.

TABLE 5

HSEC Polymerization Data for the Electron Donor 4

| | | $H_2$: 0.5 psi | |
|---|---|---|---|
| Al/Si | Mn (kg/mol) | Mw (kg/mol) | PDI |
| 7.5 | 43/41 | 302/306 | 7.0/7.5 |
| 15 | 32/37 | 309/303 | 9.7/8.2 |
| 40 | 36/35 | 289/316 | 8.1/8.9 |
| 100 | 35/33 | 280/269 | 8.1/8.2 |

While certain embodiments have been illustrated and described, it should be understood that changes and modifications may be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations may be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like, include the number recited and refer to ranges which may be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A solid precatalyst component for use in olefinic polymerization, the solid precatalyst component comprising:
   titanium;
   magnesium; and
   an electron donor compound;
   wherein:
      the electron donor compound comprises at least one compound represented by Formula (I):

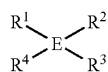
(I)

wherein:
      E is Si or Ge;
   when E is Si:
      $R^1$ and $R^2$ are independently a moiety represented by formula IIA, IIB, IIC, or IID;
      a is 0;
      b is 1 or 2;
      c is 0, 1 or 2;

$R^5$ is a $C_1$-$C_6$ alkyl, $C_3$-$C_6$ cycloalkyl, aryl or heteroaryl group, optionally interrupted or substituted by one or more functional groups selected from the group consisting of ether, ester, amide, carbonate, halogens, phosphate, sulfate, sulfide, sulfoxide, sulfone, carbamate, and a combination of any two or more thereof; and
      $R^3$ and $R^4$ together with E are cyclized to form a hydrocarbyl ring structure;
   when E is Ge:
      $R^1$ and $R^2$ are independently a moiety represented by formula IIA, IIB, IIC, IID, IIIA, or IIIB;
      a is 0, 1, 2, 3, or 4;
      b is 1 or 2; and
      c is 0, 1, 2, 3, 4, or 5;
      $R^5$ is a $C_1$-$C_6$ alkyl, $C_3$-$C_6$ cycloalkyl, aryl or heteroaryl group, optionally interrupted or substituted by one or more functional groups selected from the group consisting of ether, ester, amide, carbonate, halogens, phosphate, sulfate, sulfide, sulfoxide, sulfone, carbamate, and a combination of any two or more thereof; and
      $R^3$ and $R^4$ are independently alkyl, aryl, or heteroaryl; and
   formula IIA, IIB, IIC, IID, IIIA, and IIIB are:

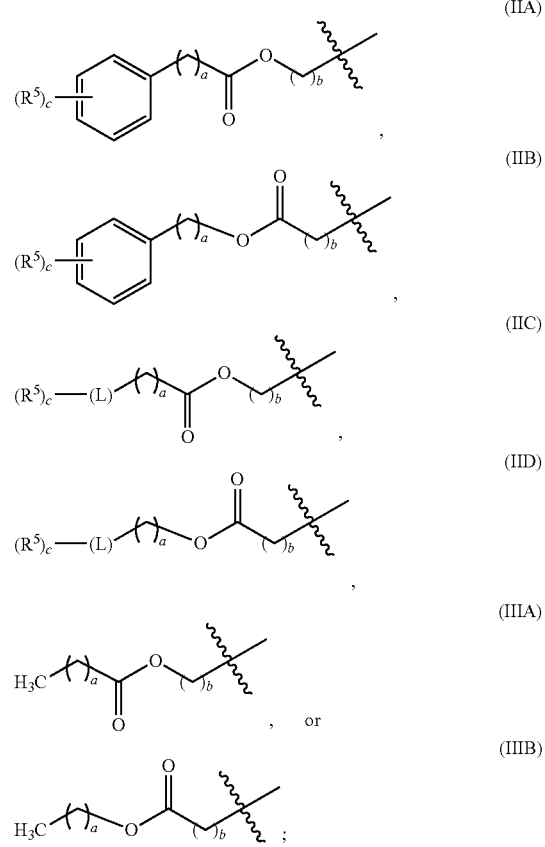

wherein:
   L comprises a heteroaryl group.

2. The solid precatalyst component of claim 1, wherein:
   E is Si;
   $R^1$ and $R^2$ are independently a moiety represented by formula IIA, IIB, IIC, or IID;

a is 0,
b is 1 or 2;
c is 0, 1 or 2;
$R^5$ is a $C_1$-$C_6$ alkyl, $C_3$-$C_6$ cycloalkyl, $C_4$-$C_6$ aryl, or $C_4$-$C_6$ heteroaryl group, optionally interrupted or substituted by one or more functional groups selected from the group consisting of ether, ester, amide, carbonate, halogens, phosphate, sulfate, sulfide, sulfoxide, sulfone, carbamate, and a combination of any two or more thereof; and
$R^3$ and $R^4$ together with E are cyclized to form a hydrocarbyl ring structure.

3. The solid precatalyst component of claim 1, wherein:
E is Ge;
$R^1$ and $R^2$ are independently a moiety represented by formula IIIA or IIIB;
a is 0, 1, 2, 3, or 4;
b is 1 or 2;
c is 0, 1, or 2; and
$R^3$ and $R^4$ are independently $C_1$-$C_{20}$ alkyl, $C_4$-$C_6$ aryl, or $C_4$-$C_6$ heteroaryl.

4. The solid precatalyst component of claim 1, wherein: $R^1$ and $R^2$ are the same.

5. The solid precatalyst component of claim 1, wherein: $R^3$ and $R^4$ are the same.

6. The solid precatalyst component of claim 1, wherein the compound represented by Formula (I) comprises:
silolane-1,1-diylbis(methylene) dibenzoate;
silinane-1,1-diylbis(methylene) bis(4-methylbenzoate);
silinane-1,1-diylbis(methylene) dibenzoate;
(diphenylgermanediyl)bis(methylene) dibenzoate;
(diphenylgermanediyl)bis(methylene) bis(4-methylbenzoate);
dibutyl 2,2'-(diphenylgermanediyl)diacetate;
(dibutylgermanediyl)bis(methylene) dibenzoate;
siletane-1,1-diylbis(methylene) dibenzoate; or
silinane-1,1-diylbis(methylene) bis(furan-2-carboxylate).

7. The solid precatalyst component of claim 1, wherein the titanium comprises a titanium compound having at least one titanium-halogen bond and the electron donor compound is supported on a magnesium halide crystal lattice.

8. The solid precatalyst component of claim 1, wherein the titanium comprises $TiCl_4$.

9. A catalyst system for use in olefinic polymerization, the catalyst system comprising:
the pre catalyst component of claim 1; and
an organoaluminum compound represented by general formula (XII):
$AlR_nX_{3-n}$(XII),
wherein
R independently represents a hydrocarbon group usually having 1 to about 20 carbon atoms, X represents a halogen atoms, and n is greater than 0, up to, and including, 3;
and optionally, further comprising an organosilicon compound represented by the formula (XIII):
$R_nSi(OR')_{4-n}$(XIII)
wherein
each R and R' independently represent a hydrocarbon group, and n is from 0 to less than 4.

10. The catalyst system of claim 9 further comprising at least one additional electron donor compound selected from the group consisting of:

a compound represented by general formula (IV):

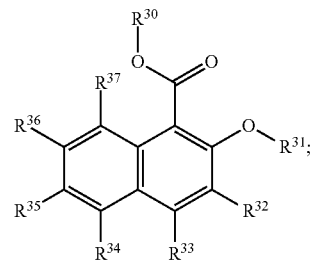

(IV)

a compound represented by general formula (V):

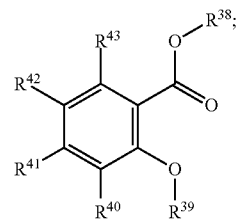

(V)

a compound represented by general formula (VI):

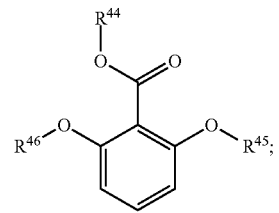

(VI)

a compound represented by general formula (VII):

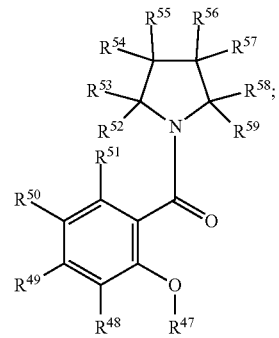

(VII)

a compound represented by general formula (VIII):

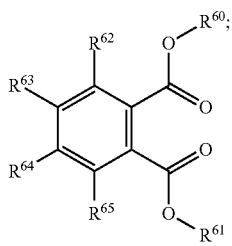

(VIII)

a compound represented by general formula (IX):

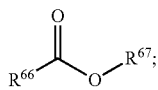

(IX)

a compound represented by general formula (X):

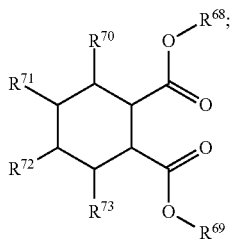

(X)

and
combinations thereof, wherein
$R^{30}$ is selected from the group consisting of a hydrogen; a halogen; and a linear or branched, cycylic or arcyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;
$R^{31}$ is selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;
$R^{32}$, $R^{33}$, $R^{34}$, $R^{35}$, $R^{36}$, and $R^{37}$ are each independently selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;
$R^{38}$ is selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;
$R^{39}$ is selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;
$R^{40}$, $R^{41}$, $R^{42}$, and $R^{43}$ are each independently selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;
$R^{44}$, $R^{45}$ and $R^{46}$ are each independently selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;
$R^{47}$ is selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;
$R^{48}$, $R^{49}$, $R^{50}$, and $R^{51}$ are each independently selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;
$R^{52}$, $R^{53}$, $R^{54}$, $R^{55}$, $R^{56}$, $R^{57}$, $R^{58}$, and $R^{59}$ are each independently selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;
$R^{60}$ and $R^{61}$ are each independently selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;

$R^{62}$, $R^{63}$, $R^{64}$ and $R^{65}$ are each independently selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;

$R^{66}$ is selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;

$R^{67}$ is selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens;

$R^{68}$ and $R^{69}$ are each independently selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens; and $R^{70}$, $R^{71}$, $R^{72}$, and $R^{73}$ are each independently selected from the group consisting of a hydrogen; a halogen; and a linear or branched, cyclic or acyclic, saturated or non-saturated $C_1$ to $C_{22}$ hydrocarbyl group, wherein the hydrocarbyl group optionally contains a —O—, —NH—, or —S— group in place of a —CH$_2$— group or a —N= group in place of a —C= group, and wherein the hydrocarbyl group is optionally substituted by one or more halogens.

11. A process of polymerizing or copolymerizing one or more olefin monomers, the process comprising:
   contacting the one or more olefin monomers with the catalyst system of claim 9 to form a polymer or a copolymer.

12. The solid precatalyst component of claim 1, wherein:
   E is Ge; and
   $R^1$ and $R^2$ are independently a moiety represented by formula IIIA or IIIB.

* * * * *